United States Patent [19]

Tahara et al.

[11] Patent Number: 5,357,314
[45] Date of Patent: Oct. 18, 1994

[54] FILM ACCUMULATOR AND FILM ACCUMULATOR/HOLDER

[75] Inventors: Toshiro Tahara; Tadashi Seto; Izumi Seto, all of Kanagawa, Japan

[73] Assignee: Fuji Photo Film Co., Ltd., Kanagawa, Japan

[21] Appl. No.: 948,583

[22] Filed: Sep. 23, 1992

[30] Foreign Application Priority Data

Jan. 29, 1992 [JP] Japan .............................. 4-014237
Feb. 12, 1992 [JP] Japan .............................. 4-025202
Feb. 24, 1992 [JP] Japan .............................. 4-036409

[51] Int. Cl.$^5$ .............................................. G03B 27/62
[52] U.S. Cl. ......................................... 355/75; 355/76
[58] Field of Search ................................ 355/75, 76

[56] References Cited

U.S. PATENT DOCUMENTS

| 4,761,675 | 8/1988 | Sawasaki | 355/76 |
| 5,153,639 | 10/1992 | Tahara et al. | 355/75 |
| 5,154,409 | 10/1992 | Kondoh | 271/178 |

Primary Examiner—Michael L. Gellner
Assistant Examiner—D. P. Malloy
Attorney, Agent, or Firm—Sughrue, Mion, Zinn, Macpeak & Seas

[57] ABSTRACT

A film accumulator includes a pressing mechanism for consecutively pressing a plurality of films which are consecutively fed out from a printer and a holding member in which the films are accumulated and held with widthwise sides of the pressed films retained therein. Accordingly, the plurality of films can be accumulated automatically.

22 Claims, 23 Drawing Sheets

FILM ACCUMULATOR AND FILM ACCUMULATOR/HOLDER

BACKGROUND OF THE INVENTION

1. Field of the Invention

The present invention relates to a film accumulator for accumulating films fed out from a printer, an automatic processor, or the like.

2. Description of the Related Art

When an elongated negative film is fed to a printer and a printing operation is completed, an operator performs an operation of taking out this negative film from an exit port of the printer and suspending it from a hook or the like. Therefore, in cases where a multiplicity of negative films are supplied to the printer, it is necessary for the operator to perform the operation of taking out the negative film upon completion of each printing operation. Hence, automatic film accumulation has not been possible.

SUMMARY OF THE INVENTION

In view of the above-described fact, it is an object of the present invention to provide a film accumulator capable of automatically accumulating films fed out from a printer or a processor, without causing damage to the image plane.

Another object of the present invention is to provide a film accumulator and a film accumulator/holder capable of automatically accumulating consecutive films fed out from a printer or a processor and monitoring an accumulated state thereof without causing damage to the image plane.

Still another object of the present invention is to provide a moving mechanism for a film accumulator in which, when an operator performs an operation in the vicinity of a printer, the film accumulator can be retracted while the state of films accumulated in the film accumulator is being maintained, thereby securing an operating space for the operator in the vicinity of the printer.

In accordance with a first aspect of the present invention, there is provided a film accumulator for accumulating a plurality of films which are consecutively fed out, comprising: a support portion on which the plurality of films which are fed out are placed in an accumulated state; and holding means for holding together trailing ends of the plurality of films fed out and placed on the support portion.

In accordance with the above-described first aspect, the films which are fed out from the printer or the automatic processor are placed on the support portion. Since the trailing ends of the films placed on the support portion are held together by the holding means, by taking out this holding means, a bundle of the accumulated films can be transported for an ensuing process in a state in which all the films are accumulated.

In accordance with a second aspect of the invention, there is provided a film accumulator for accumulating a plurality of films which are consecutively fed out, comprising: holding means for holding widthwise sides of a longitudinal partial portion of each of the films which are consecutively fed out; and pressing means for consecutively pressing in a thicknesswise direction of the film each of the films which are consecutively fed so as to accommodate the films in the holding means.

In accordance with this second aspect, when the film is fed out from the printer or the processor, the pressing means consecutively presses the films in the thicknesswise direction thereof to allow the holding means to hold the sides of a longitudinal partial portion of each film. Accordingly, in this aspect of the invention, if the trailing ends, for instance, of the fed-out films are held by the holding means, all the films can be taken out in the accumulated state by taking out this holding means. In addition, since the accumulation in the holding means is effected as the pressing means presses each of the films in the thicknesswise direction of the film, the plurality of films are prevented from moving while sliding over the surface of an adjacent one of the films. Hence, damage to the films can be prevented.

In accordance with a third aspect of the invention, there is provided a film accumulator for accumulating a plurality of films which are consecutively fed out, comprising: guiding means for movably guiding the film in the longitudinal direction of the film in correspondence with the sides of each of the films which are consecutively fed out; pressing means for pressing in a thicknesswise direction of the film each of the films held by the guiding means so as to move each of the films from the guiding means; holding means for holding the sides of longitudinal partial portions of the plurality of the moved films; and driving means for canceling the guiding of the film by causing the guiding means to retract in the widthwise direction of the film when the film is pressed by the pressing means.

In the above-described aspect, when the film is fed out from the printer or the processor, the film is moved in the longitudinal direction thereof along the guiding means. Subsequently, the driving means causes the guiding means to be retracted in the widthwise direction of the film, and the pressing means moves the film in the thicknesswise direction thereof so as to allow the film to be accommodated and held in the holding means.

In addition, the aforementioned driving means can be interlocked with the pressing means. Accordingly, in this case, when the guiding of the film is canceled, the film is accommodated into the holding means by the pressing means.

In accordance with a fourth aspect of the invention, there is provided a film accumulator for accumulating a plurality of films which are consecutively fed out, comprising: guiding means for movably guiding the film in the longitudinal direction of the film in correspondence with the sides of each of the films which are consecutively fed out; pressing means for consecutively pressing in a thicknesswise direction of the film each of the films held by the guiding means so as to cause the film to be curved along the widthwise direction thereof and to be deflected as viewed in the longitudinal direction thereof, thereby releasing the film from the guiding means; and holding means for holding the sides of longitudinal partial portions of the plurality of the films thus released.

In the above-described aspect, when the film held in the guiding means is pressed in the thicknesswise direction, the film is pressed as held by the guiding means. In this case, the film is deflected in the widthwise direction and both sides of the film which are portions to be guided are disengaged from the guiding means. When the sides are disengaged, the sides of a longitudinal partial portion of the film are immediately held by the holding means, so that the film is not set in a free state. Hence, even if the film having a relatively stiff body is twisted on the downstream side thereof, the film is prevented from becoming disarranged due to the flexing force of the film itself. Thus, the film can be held stably in the holding means.

In accordance with a fifth aspect of the invention, there is provided a film accumulator for accumulating a plurality of films which are consecutively fed out, comprising: pressing means for consecutively pressing in a thicknesswise direction of the film the plurality of films which are consecutively fed out; a holder for holding widthwise sides of the plurality of films pressed by the pressing means so as to accumulate and hold the films which are consecutively pressed; and film accumulation-amount detecting means for detecting a state of accumulation of a predetermined number of the films by being pressed by a lowermost one of the films when the number of the films accumulated in the holder has reached the predetermined number.

According to the above-described aspect, when the films, for which the printing operation in a printer, for instance, have been completed, are consecutively fed out, each of the films is pressed in the thicknesswise direction of the film by the pressing means. The pressed films are held and accumulated in the holder with the widthwise sides thereof being held therein. For this reason, it is possible to accumulate a plurality of films in the holder, so that it is unnecessary to take out each film upon completion of the printing operation of each film.

Here, when a predetermined amount of accumulation is reached, i.e., when the holder becomes full, the films must be taken out. When the amount of accumulation of the films reaches a predetermined amount, the film accumulation-amount detecting means detects the state of accumulation of this predetermined amount by being pressed by a lowermost one of the films. In other words, when the film accumulation amount is less than the predetermined amount, the accumulated films and the film accumulation-amount detecting means do not contact each other, so that no damage is caused to the film plane and the like.

Through this detection, if the operator is informed to that effect by means of, for instance, an alarm, display, or the like, the operator is able to ascertain a period of taking out the films. For this reason, the films can be accumulated without requiring the operator to constantly monitor the state of accumulation in the holder, so that the operating efficiency improves.

It should be noted that the printing operation by the printer may be stopped when the predetermined amount of accumulation is detected by the film accumulation-amount detecting means.

In accordance with a sixth aspect of the invention, there is provided a film holder for accumulating a plurality of films which are consecutively fed out, by pressing each of the films in a thicknesswise direction thereof at a predetermined position, comprising: a holder body having an accommodating portion for holding both sides of each of the films and formed in a substantially U-shaped configuration so as to correspond to one surface of each of the films and to both sides thereof, wherein a through hole is provided in a bottom portion thereof corresponding to the one surface, contacting means being inserted in the through hole for detecting an amount of accumulation of the films by being pressed by the films when an amount of accumulation of the films in the accommodating portion has reached a sufficient amount, e.g., when a predetermined number of the films to be accommodated has been reached.

In accordance with the above-described aspect, a through hole is disposed in the bottom portion of the holder body, the through hole being used for insertion of contacting means for detecting an amount of accumulation by being pressed by the films in a state when the amount of accumulation of the films in the accommodating portion has reached a sufficient amount. In a state in which there are no films in the accommodating portion, or the amount of accumulation is small, this contacting means projects toward the accommodating portion side, and is spaced apart from a lowermost one of the films. When the amount of accumulation of the films becomes large, the contacting means is pressed by the lowermost one of the films. For this reason, the amount of the films accumulated in the accommodating portion of the holder body can be ascertained through an amount of movement of the contacting means.

For instance, if the state of movement of this contacting means is detected by a sensor such as a limit switch or indicated by an indicator, the operator can readily ascertain the amount of accumulation of the films.

In addition, when the holder filled with the films is removed, the contacting means and the holder are not connected to each other, and the contacting means is simply accommodated in the through hole. Hence, the replacement operation of the holder is facilitated.

In accordance with a seventh aspect of the invention, there is provided a film-accumulator moving mechanism for retracting the film accumulator when a working space is required downstream of a printer, the film accumulator being disposed downstream of the printer and adapted to accumulate the films by consecutively pressing the films which are consecutively fed out upon completion of print processing in the printer and by holding both sides of the films pressed, the film-accumulator moving mechanism comprising: a unit base to which the film accumulator is assembled and which is supported on a table of the printer in such a manner as to be movable relative to the table; and retracting means for causing the unit base to be retracted to the downstream side of the printer to a position located farther away in a transverse direction from an operating position.

In accordance with the above-described aspect, since the film accumulator is disposed downstream of the printer, the films, for which print operation has been completed and are consecutively fed out, are pressed in the direction of the film thickness. Then, as both sides of the film are held thus pressed, the films can be held in an accumulated state.

In the case of films which are cut in frames (piece films), there are cases where the operator extends his or her arms to the upstream and downstream sides of the printer to perform a positioning operation or the like.

At that time, the retracting means causes the unit base (to which the film accumulator is assembled) located downstream of the printer from the downstream side of the printer. As a result, it is possible to secure a working space into which the operator extends his or her arms on the upstream and downstream sides of the printer, thereby improving the operating efficiency.

In addition, in cases where print processing is performed by using half-size films, the transport of the half-size films is oriented in a direction offset 90° with respect to the direction in which the films are usually transported. In other words, the films are fed in from this side of the printer toward the farther side thereof in the transverse direction of the printer. In this case as well, by keeping the accumulator retracted, the working space can be secured.

In accordance with an eighth aspect of the invention, there is provided a film-accumulator moving device for retracting the film accumulator when a working space is required downstream of a printer, the film accumulator being disposed downstream of the printer and adapted to accumulate the films by consecutively pressing the films which are consecutively fed out upon completion of print processing in the printer and by holding both sides of the films pressed, the film-accumulator moving mechanism comprising: a unit base to which the film accumulator is assembled and which is supported on an upper surface of a table of the printer in such a manner as to be movable relative to the table; and moving means including a pair of arms having one ends respectively rotatably supported by a pair of shafts which are arranged at a predetermined interval therebetween on an upper surface of the table, and other ends respectively rotatably supported by another pair of shafts which are arranged at the same interval as the predetermined interval therebetween on a lower surface of the unit base, the moving means being adapted to move the unit base in parallel further downstream of the printer and farther away in a transverse direction thereof from an operating position for the printer.

In accordance with the above-described aspect, the unit base is coupled with the table by means of a pair of arms. As the pair of arms are rotated about the table-side shafts, respectively, the unit base moves. At that time, since the unit base and the arms rotate relative to each other about the unit base-side shafts, the unit base moves in parallel to the table, and moves to the downstream side and transversely farther side of the printer (parallel link mechanism).

For this reason, even if the films are moved as accumulated in the film accumulator, since the axis of the films accumulated always remain parallel, the films are prevented from being twisted or dislocated from a state in which they are held.

The other objects, features and advantages of the present invention will become more apparent from the following detailed description of the invention when read in conjunction with the accompanying drawings.

DESCRIPTION OF THE PREFERRED EMBODIMENTS

[First Embodiment]

Figure 1:
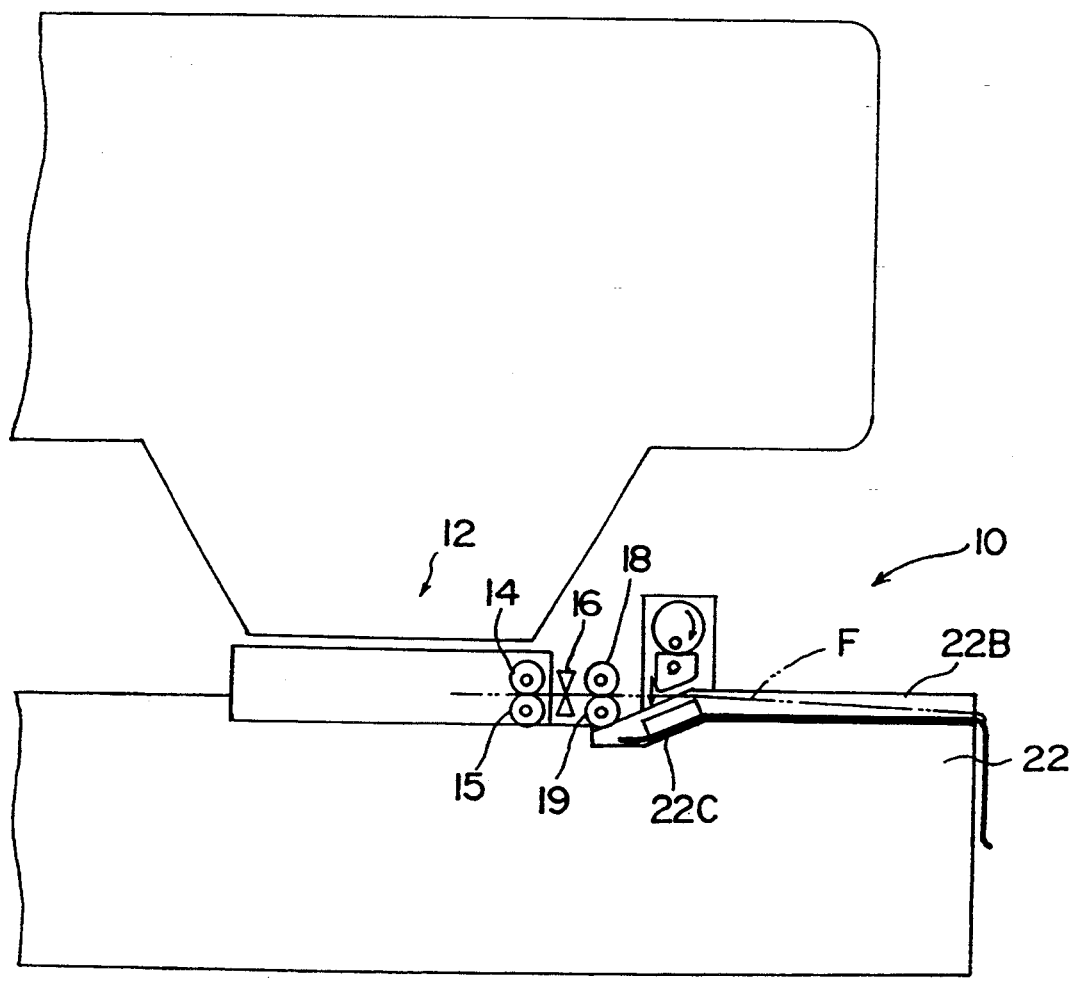
FIG. 1 is a vertical cross-sectional view of a negative film accumulator to which a first embodiment of the present invention is applied.
Figure 2:
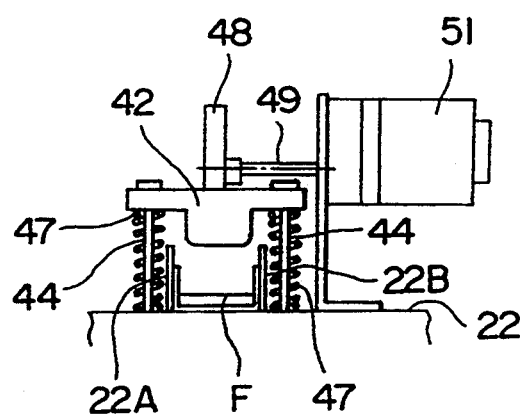
FIG. 2 is a right side elevational view of FIG. 1.

FIGS. 1 and 2 show a first embodiment of a negative film accumulator 10 to which the present invention is applied. In this negative film accumulator 10, a negative film F for which a printing operation at a printing section 12 has been completed is fed out through nip-transport rollers 14, 15, a sensor 16, and nip-transport rollers 18 and 19, all of which are located at a rear end of the printing section 12. A support base 22 is provided downstream of the nip-transport rollers 18 and 19, and the negative film F can be moved downstream while being guided by guides 22A and 22B disposed upright on both sides of the support base 22. An upstream-side end portion of the support base 22 is formed as an inclined portion 22C which is gradually inclined downward toward the upstream end of the support base 22, and the upstream end extends to a lower side of the nip-transport roller 19.

Figure 4:
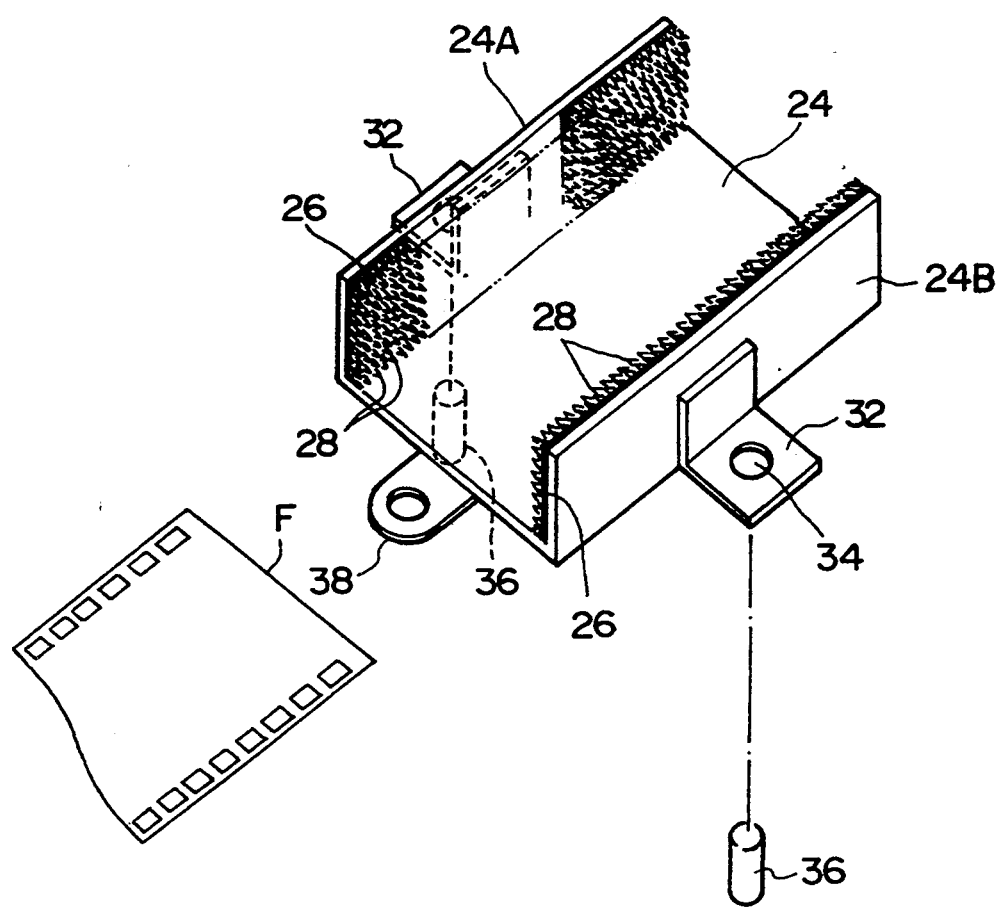
FIG. 4 is a perspective view of a holder.

A holder 24 constituting a film holding means is disposed on the inclined portion 22C. As shown in FIG. 4, this holder 24 is formed of a plate material bent in a U-shape, and a cloth material 26 is attached to opposing surfaces of side plates 24A and 24B which are bent end portions. An interval between these pieces of cloth material 26 is set to be identical to or slightly wider than the widthwise dimension of the negative film F. A multiplicity of engaging projections 28 project from the cloth material 26. As these engaging projections 28, it is possible to use synthetic resin filaments whose tips are bent, loop-like synthetic resin filaments whose opposite ends are secured to the cloth material 26, or other similar material. As both sides of the negative film F are engaged with these engaging projections 28, the negative film F can be held by the holder 24. The arrangement provided is such that, when the negative films F are held in a superimposed state between the two pieces of cloth material 26, the negative films F are capable of moving in the longitudinal direction thereof with a relatively light external force, but cannot move readily in the thicknesswise direction thereof.

An L-shaped projection 32 is secured to the outside of each of the side plates 24A and 24B, and a through hole 34 is formed in one of the L-shaped projections 32. This through hole 34 is used for insertion of a retaining pin 36 projecting from the inclined portion 22C, so that the holder 24 can be easily positioned and secured to the support base 22. Furthermore, a projection 38 having a through hole projects from a longitudinal end of the holder 24. When the holder 24 is removed together with the negative films F, the holder 24 can be hung on an unillustrated hook by using this projection 38, so that the negative films F can be stored in the holder 24 with the longitudinal direction of the negative films F set in the vertical direction.

Figure 3A:
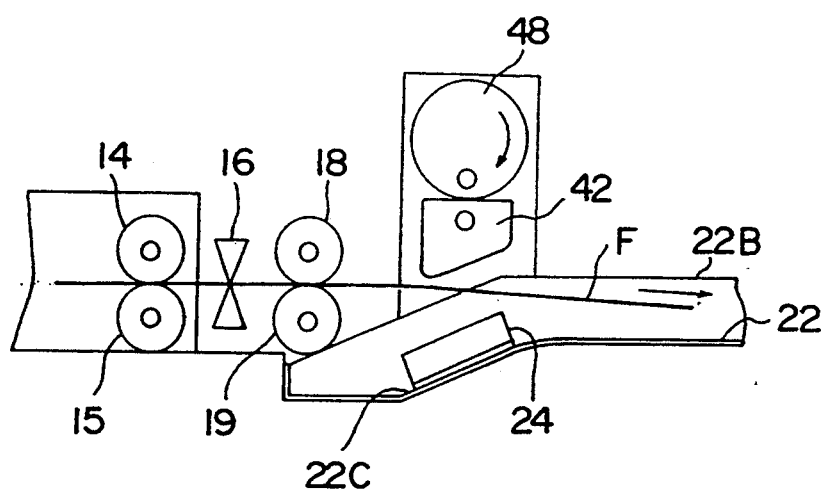
FIGS. 3A and 3B are operational diagrams illustrating the state of movement of a negative film.

As shown in FIG. 2, a pressing block 42 is disposed above the support base 22. Guide posts 44 disposed upright on the support base 22 penetrate this pressing block 42, so that the pressing block 42 is vertically movable while being guided by the guide posts 44. The pressing block 42 is normally set in the state shown in FIG. 3A in which the pressing block 42 is retracted upwardly by urging forces of compression coil springs 47.

Figure 3B:
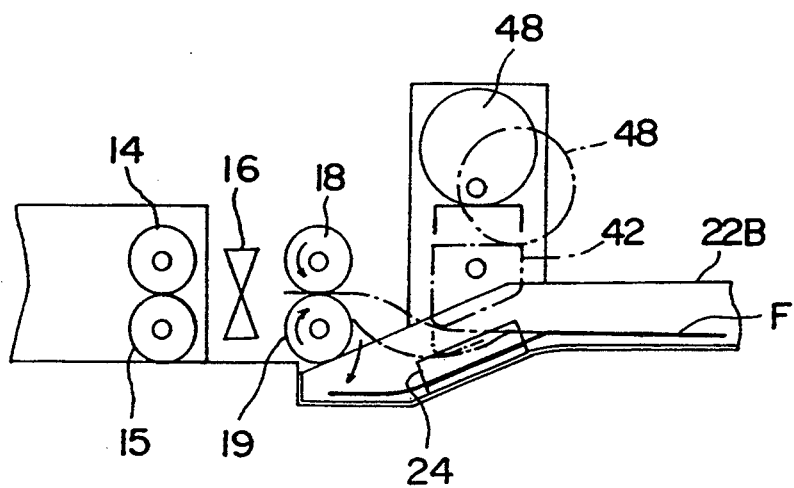

An eccentric cam 48 is disposed on a top surface of the pressing block 42. A rotating shaft 49 fixed to the eccentric cam 48 is coupled with an output shaft of a motor 51. Accordingly, as the motor 51 rotates, the eccentric cam 48 lowers the pressing block 42 against the urging forces of the compression coil springs 47, as shown in FIG. 3B, so as to accumulate the fed-out trailing ends of the negative films F in the thicknesswise direction in the holder 24.

A description will now be given of the operation of the first embodiment.

The negative film F for which the printing operation has been completed in the printing section 12 is fed out onto the support base 22, beginning with the printed leading end thereof, through the nip-transport rollers 14 and 15, the sensor 16, and the nip-transport rollers 18 and 19. The printed leading end of the negative film F is suspended from the downstream end of the support base 22 while sliding over the support base 22, as shown in FIG. 1. When the printed trailing end of the negative film F passes through the sensor 16, the motor 51 rotates the eccentric cam 48. As a result, the eccentric cam 48 pushes down the pressing block 42, and the pressing block 42 pushes the printed trailing end of the negative film F into the holder 24. In this case, as shown in FIG. 3B, as the pressing block 42 is lowered with the printed trailing end of the negative film F abutting against the nip-transport roller 19, a force which pushes down the trailing end of the negative film F by the rotation of the nip-transport roller 19 is produced, so that the operation of accumulating the negative films F is effected reliably.

Since the pressing block 42 accumulates the printed trailing end of the negative film F on the support base 22 each time the negative film F is fed out from the printing section 12, the printed trailing ends of a multiplicity of negative films F are held in a superimposed state in the holder 24. When the accumulation of a predetermined number of negative films F is completed, the holder 24 is removed by lifting the L-shaped projection 32 off the retaining pin 36. The holder is then suspended from the hook or the like by making use of the projection 38, thereby completing the storing operation.

[Second Embodiment]

Figure 5:
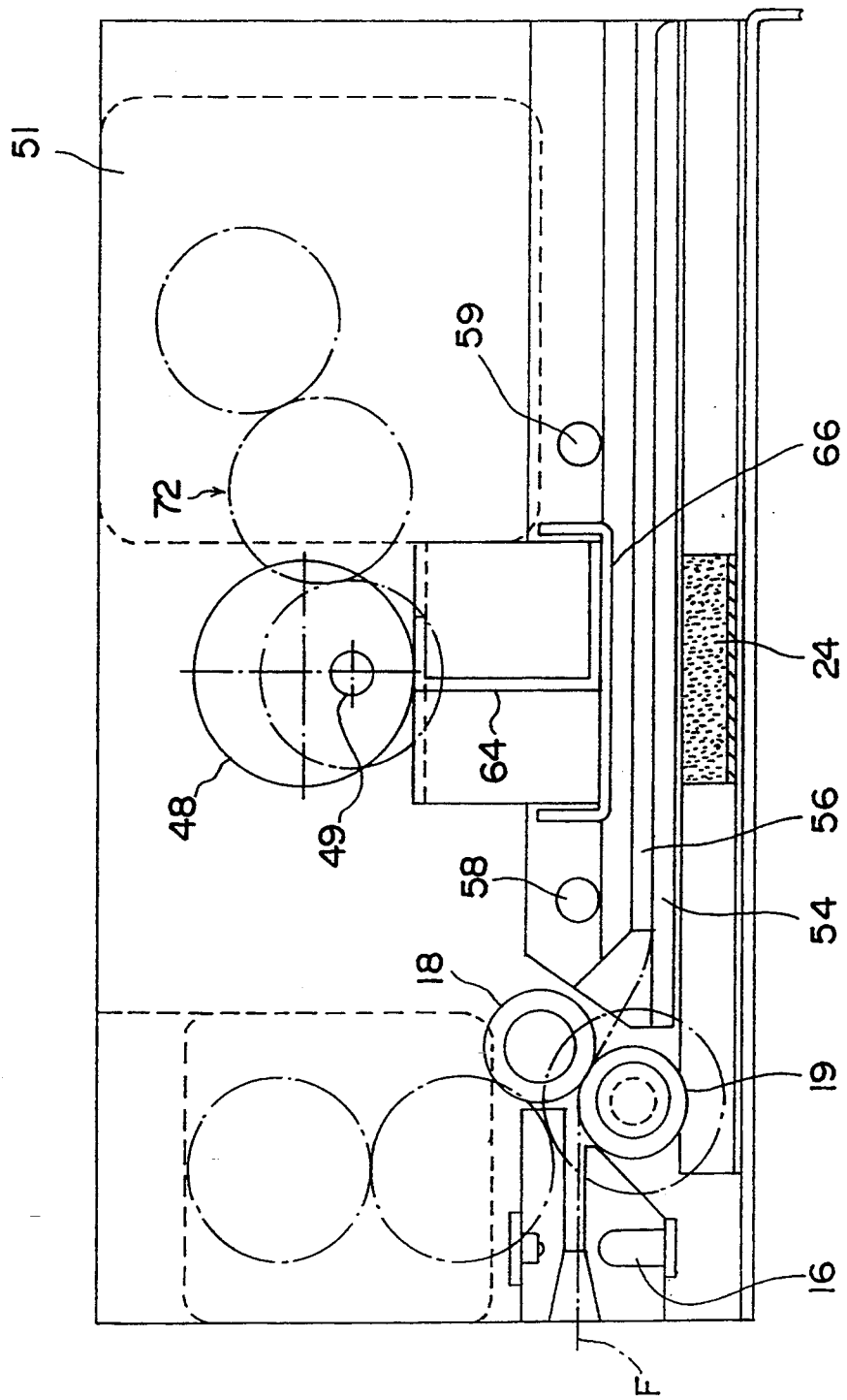
FIG. 5 is a vertical cross-sectional view of a negative film accumulator in accordance with a second embodiment of the present invention.
Figure 6:
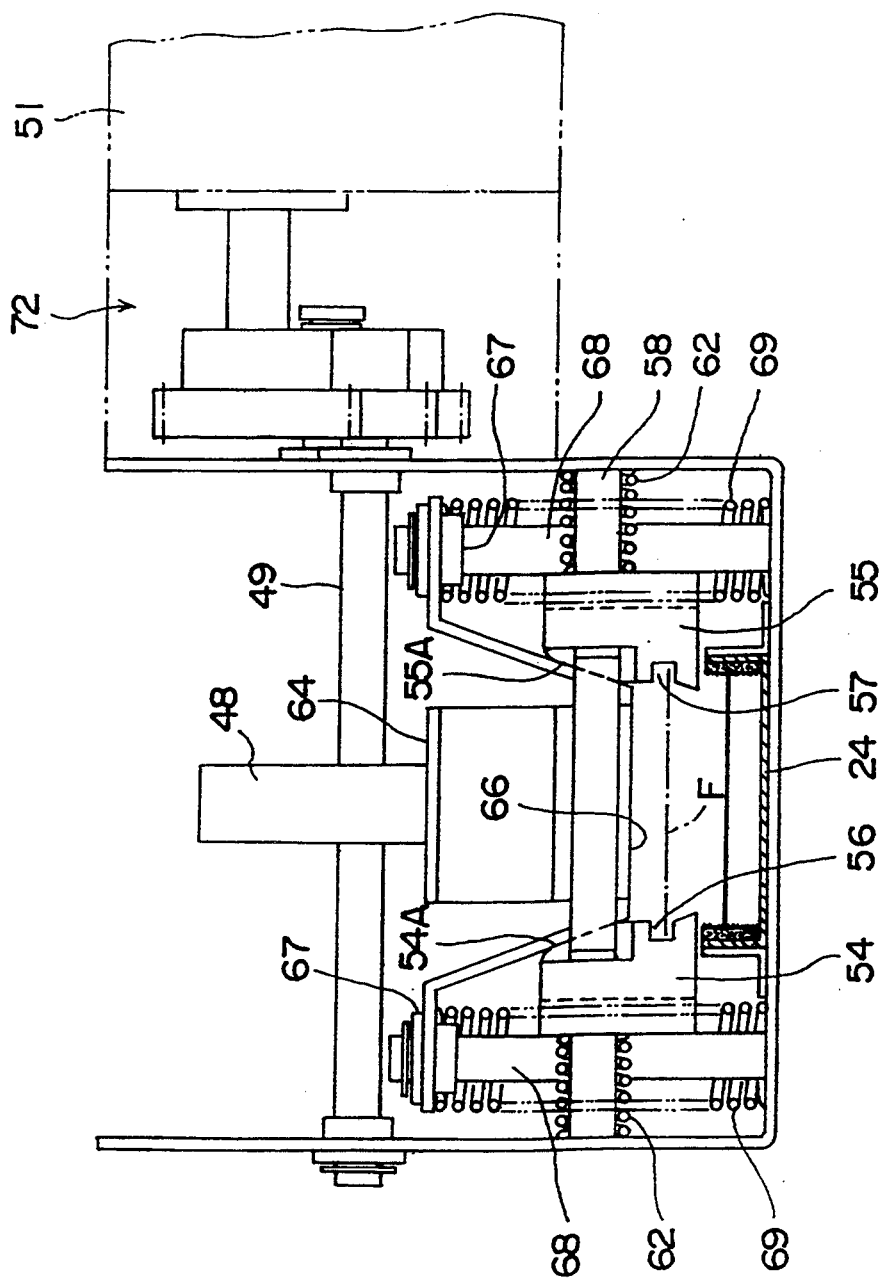
FIG. 6 is a right side elevational view of FIG. 5.
Figure 7:
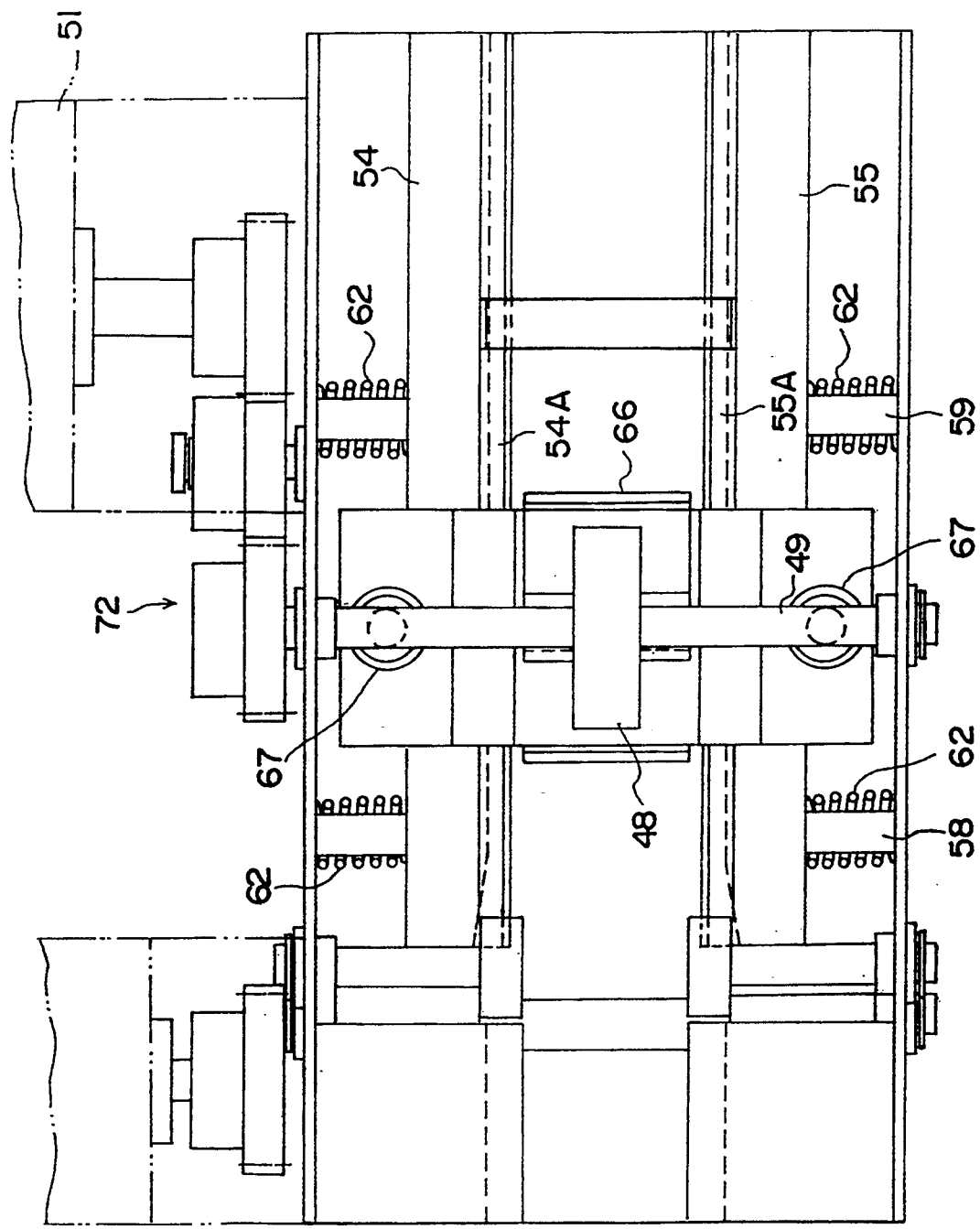
FIG. 7 is a plan view of FIG. 5.

FIGS. 5 to 7 show a second embodiment of the present invention. In this embodiment, changing means for changing a traveling direction of the film comprises the nip-transport rollers 18 and 19 which are disposed in such a manner that a tangent thereto is inclined, with the result that the negative film F being fed out is oriented diagonally downwardly and is guided into grooves or slits 56 and 57 formed in opposing surfaces of guide blocks 54 and 55. These slits 56 and 57 accommodate both sides of the negative film F, and image portions located in a widthwise central portion of the negative film F are set in a state of noncontact.

Guide shafts 58 and 59 disposed along the widthwise direction of the negative film F penetrate the guide blocks 54 and 55, respectively, and are capable of moving toward or away from each other. Compression coil springs 62 which are attached to the guide shafts 58 and 59 urge the guide blocks 54 and 55 in a direction in which the guide blocks 54 and 55 approach each other.

Upper ends of opposing surfaces of the guide blocks 54 and 55 are formed as tapered surfaces 54A and 55A, and a lifting bracket 66 is inserted between the tapered surfaces 54A and 55B. This lifting bracket 66 has outer side surfaces which come into planar contact with the tapered surfaces 54A and 55A. Upper end portions of the lifting bracket 66 are bent horizontally away from each other, and sleeves 67 are secured to the respective bent portions. These sleeves 67 are vertically movable along respective guide posts 68 disposed vertically, and are urged upwardly by compression coil springs 69. That is, the lifting bracket 66 is urged in a direction in which it is drawn out from between the guide blocks 54 and 55.

The eccentric cam 48 corresponds to an upper end surface of a pressing bracket 64 secured within the lifting bracket 66. The rotating shaft 49 of the eccentric cam 48 is coupled with the motor 51 via a reduction gear train 72. As a result, the motor 51 causes the pressing bracket 64 and the lifting bracket 66 to be lowered via the eccentric cam 48 to cause the guide blocks 54 and 55 to be spaced apart from each other. At the same time, the negative film F is released from between the tapered surfaces 54A and 55A and is pressed downwardly, thereby allowing the negative film F to be accommodated in the holder 24 located therebelow.

A description will now be given of the operation of the second embodiment.

The negative film F for which the printing operation has been completed passes through the nip-transport rollers 18 and 19 and is pushed to the space between the guide blocks 54 and 55. In this state, since the guide blocks 54 and 55 are in a state in which their tapered surfaces 54A and 55A clamp the lifting bracket 66, as shown in FIG. 6, an amount of approach of the guide blocks 54 and 55 to each other is restricted. Thus, both sides of the negative film F are inserted into the slits 56 and 57, respectively. When the passage of the printed trailing end of the negative film F through the sensor 16 is detected, the motor 51 is driven to rotate the eccentric cam 48. Consequently, the pressing bracket 64 and the lifting bracket 66 are lowered, and the guide blocks 54 and 55 are moved away from each other by the lifting bracket 66, thereby allowing both sides of the negative film F to be released. At the same time, the lifting bracket 66 presses the negative film F in the thicknesswise direction to insert the same into the holder 24. As the motor 51 rotates further, the lifting bracket 66 is raised again and is returned to the state shown in FIG. 6, so that the insertion of an ensuing negative film F becomes possible. Since the ensuing negative film F which is fed in does not slide over the previous negative film F which has already been accommodated in the holder 24, no damage is caused to the image plane. In this manner, the multiplicity of negative films F are consecutively superposed one on top of another in the holder 24. The holder 24 can be removed with the trailing ends of the negative films F accumulated in the same way as in the first embodiment, and an ensuing operation can be performed.

It should be noted that, in the above-described second embodiment, the arrangement for causing the guide blocks 54 and 55 to move toward or away from each other is not limited to the above-described cam engagement between the tapered surfaces 54A and 55A and the lifting bracket 66. For instance, it is possible to adopt an arrangement in which the guide blocks 54 and 55 are moved toward or away from each other by means of a link, a gear, a screw, or other similar means. In addition, the guide blocks 54 and 55 of the second embodiment may be disposed on the horizontal portion of the support base 22 of the first embodiment in order to guide an intermediate portion of the negative film F. In this case, the guide blocks 54 and 55 for guiding the intermediate portion of the negative film F may simply be made to move toward or away from each other. Since the operation of pressing the negative film F in the thicknesswise direction thereof and accommodating the same in the holder 24 is effected by the pressing block 42, the pressing bracket 64 and the lifting bracket 66 shown in FIG. 6 are not necessarily required. Namely, it is sufficient if a mechanism for merely causing the guide blocks 54 and 55 to move toward or away from each other is used.

[Third Embodiment]

A description will now be given of a third embodiment of the present invention. In this third embodiment, the same component parts as those of the above-described second embodiment will be denoted by the same reference numerals, and a description of the arrangement thereof will be omitted.

Figure 8:
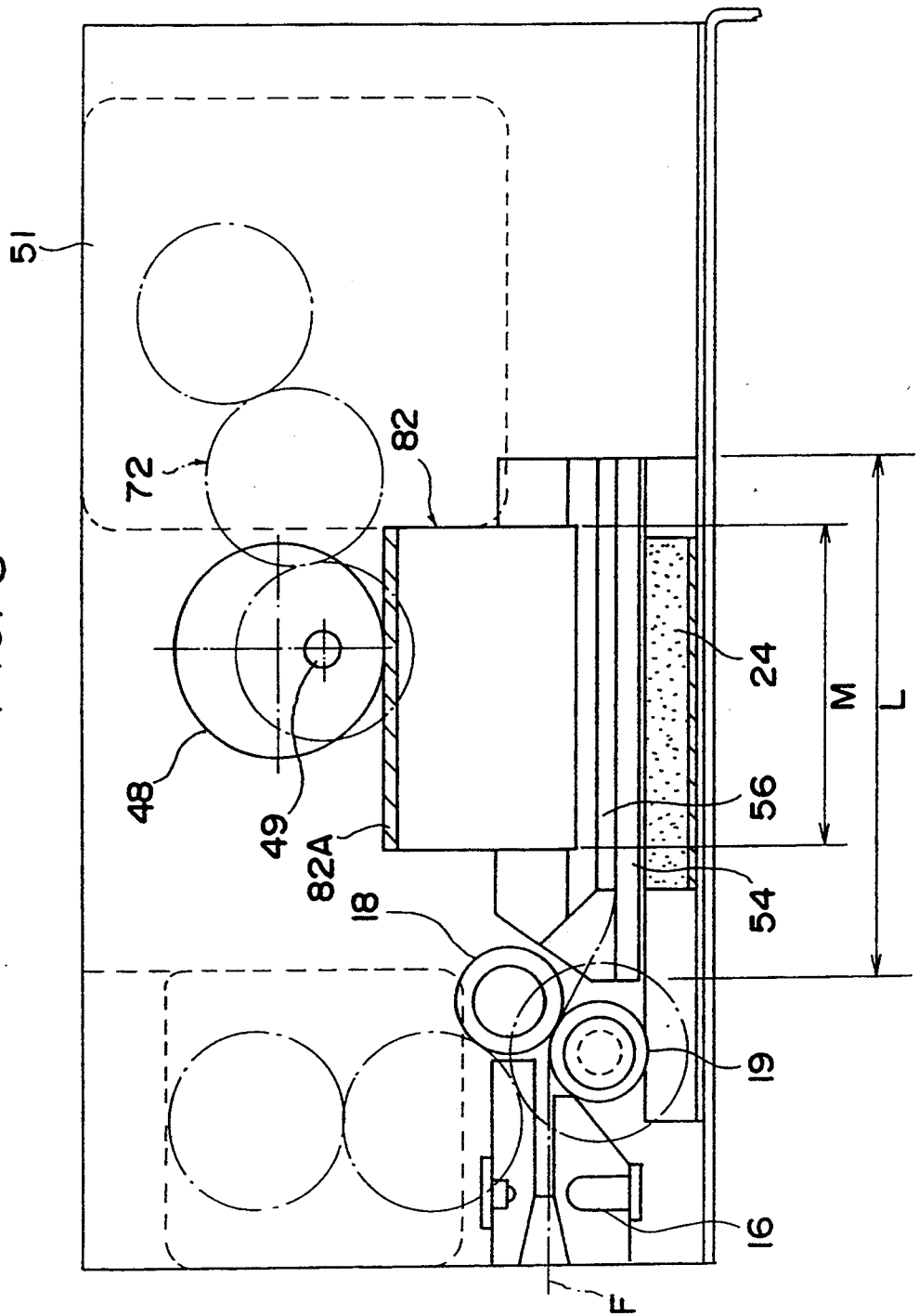
FIG. 8 is a vertical cross-sectional view of a negative film accumulator in accordance with a third embodiment of the present invention.
Figure 9:
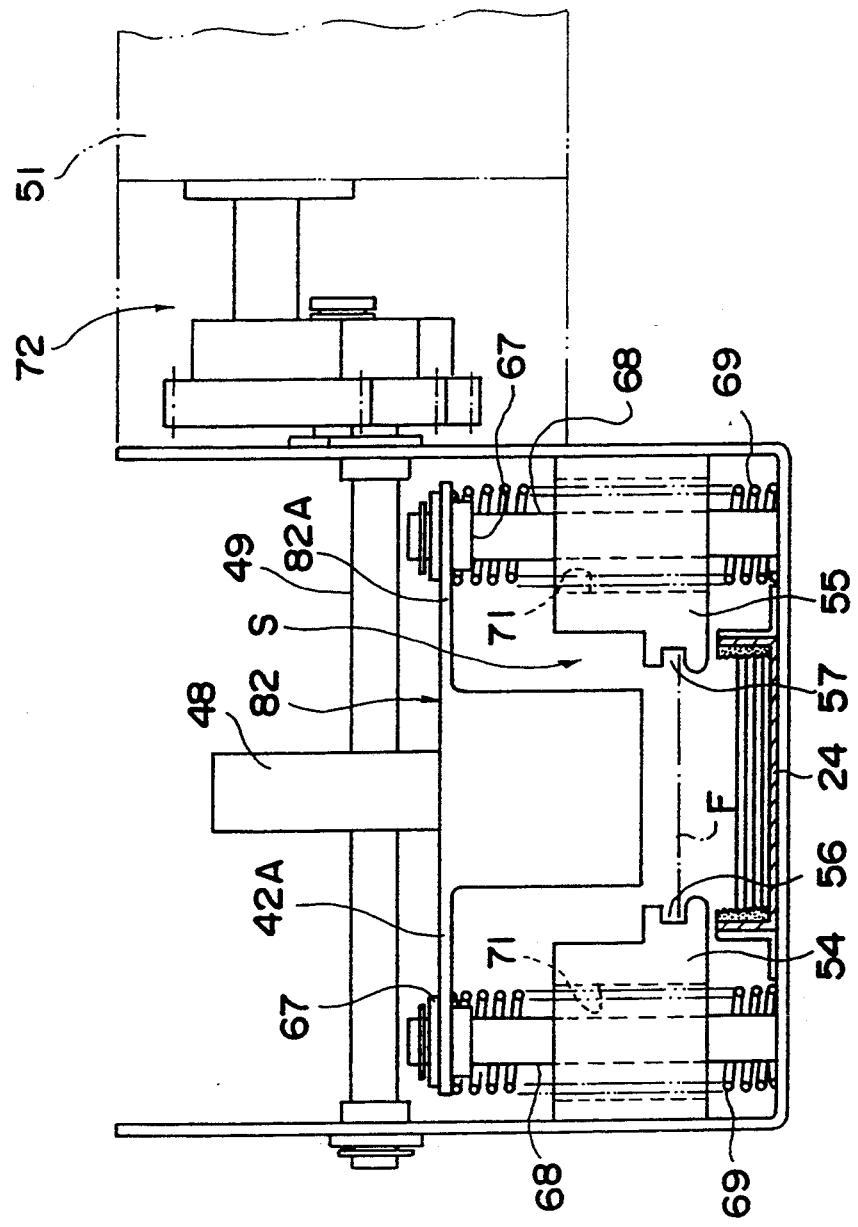
FIG. 9 is a right side elevational view of FIG. 8.

As shown in FIG. 8, in this third embodiment, the nip-transport rollers 18 and 19 are disposed in such a manner that a tangent thereto is inclined in the same way as in the second embodiment, with the result that the negative film F being fed out is oriented diagonally downward. As shown in FIG. 9, the negative film F is guided into the slits 56 and 57 formed in opposing surfaces of the guide blocks 54 and 55.

These guide blocks 54 and 55 are fixedly disposed, and their longitudinal dimension L (along the longitudinal direction of the film F) is set to be slightly longer than a longitudinal dimension M of a pressing block 82.

A horizontal flange 82A is formed on an upper end portion of the pressing block 82, and the pair of sleeves 67 are secured thereto. These sleeves 67 are vertically movable along the respective guide posts 68 disposed vertically, and are urged upwardly by the compression coil springs 69.

It should be noted that intermediate portions of the guide posts 68 and the compression coil springs 69 are respectively passed through through holes 71 formed in the guide blocks 54 and 55. Hence, the guide blocks 54 and 55 do not interfere with the guide posts 68 and the compression coil springs 69.

The aforementioned pressing block 82 is adapted to be inserted into a space S between the guide blocks 54 and 55. That is, the eccentric cam 48 is disposed in face-to-face relation with an upper end surface of the pressing block 82, and the rotating shaft 49 of the eccentric cam 48 is coupled with the motor 51 via the reduction gear train 72. As the eccentric cam 48 is made to undergo one revolution by the driving force of the motor 51, the pressing block 82 enters the aforementioned space S between the guide blocks 54 and 55 and reciprocates along a path leading to the holder 24 disposed below the guide blocks 54 and 55.

For this reason, the film F, which is located on the moving path of the pressing block 82 by being guided by the slits 56 and 57 in the guide blocks 54 and 55, is pressed toward the holder 24 by the approaching movement of the pressing block 82.

Figure 10A:
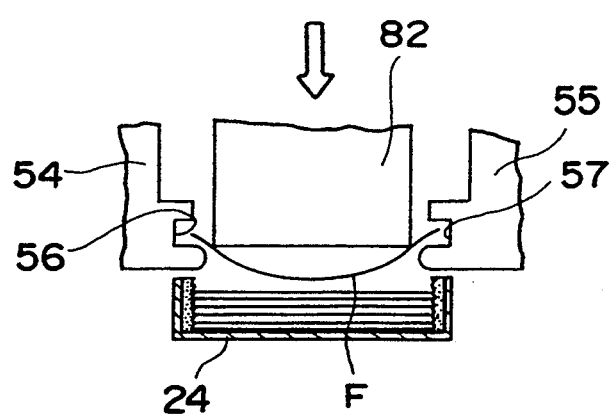
FIG. 10A is an operational diagram when a pressing block has started to move from the state shown in FIG. 9.
Figure 10B:
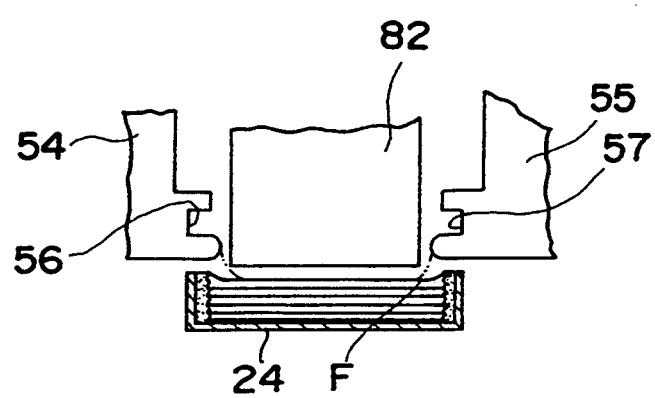
FIG. 10B is an operational diagram when the pressing block has reached a lowermost position.

At this time, the film F is curved along the widthwise direction thereof and is deflected as seen in the longitudinal direction thereof (see FIG. 10A), allowing the film F to be released from the slits 56 and 57. The moment the film F is released, the deflection is canceled, and the film F is held in the holder 24 (see FIG. 10B).

A description will now be given of the operation of the third embodiment.

The negative film F for which the printing operation has been completed passes through the nip-transport rollers 18 and 19 and is pushed to the space between the guide blocks 54 and 55, and both sides of the negative film F are inserted into the slits 56 and 57, respectively. When the passage of the printed trailing end of the negative film F through the sensor 16 is detected, the motor 51 is driven to rotate the eccentric cam 48 by one revolution. Consequently, the pressing block 82 in the state shown in FIG. 9 is lowered (approaching movement) and enters the space S between the guide blocks 54 and 55 (see FIG. 10A). Since the negative film F is pressed by this pressing block 82, the negative film F is curved along the widthwise direction thereof and is deflected as seen in the longitudinal direction thereof. Due to this deflection, the sides of the negative film F are released from the slits 56 and 57 (see FIG. 10B).

The moment the film F is released, the aforementioned deflection is canceled, and the sides of the negative film F are held in the holder 24. That is, instead of the arrangement adopted in the second embodiment in which the guide blocks 54 and 55 are made to move toward or away from each other, the arrangement adopted in this third embodiment is such that the negative film F is curved along the widthwise direction thereof so as to be released from the slits 56 and 57. For this reason, the negative film F is held either in the slits 56 and 57 formed in the guide blocks 54 and 55 or in the holder 24, and is not set temporarily free. Hence, even if the negative film F has undergone twisting at a leading end or intermediate portion thereof, each negative film F can be held reliably in the holder 24 in proper form.

Next, the pressing block 82 is raised again (returning movement) and is retracted from the space S between the guide blocks 54 and 55, so that the insertion of an ensuing negative film F becomes possible. In this manner, the multiplicity of negative films F are consecutively superposed one on top of another in the holder 24. The holder 24 can be removed with the trailing ends of the negative films F accumulated in the same way as in the first and second embodiments, and an ensuing operation can be performed.

Although, in the third embodiment, the longitudinal dimension L of the guide blocks 54 and 55 is set to be slightly longer than the longitudinal dimension M of the pressing block 82, this setting is provided to ensure that the negative film F can be reliably released from the slits 56 and 57 by being pressed by the pressing block 82. Accordingly, if the longitudinal dimension of the pressing block 82 is set to be large, the length of the guide blocks 54 and 55 can also be set correspondingly large.

In addition, independent guide blocks may be disposed on the horizontal portion of the support base 22 for guiding the intermediate portion of the negative film F. In this case, it is preferred that the guide blocks for guiding the intermediate portion of the negative film F be made independently movable toward or away from each other, and that the movement toward or away from each other be synchronized with the operation of pressing the negative film F in the thicknesswise direction thereof and accommodating the same into the holder 24.

Thus, the first to third embodiments offer an outstanding advantage in that the negative films which are fed out can be automatically accumulated consecutively.

[Fourth Embodiment]

Figure 11:
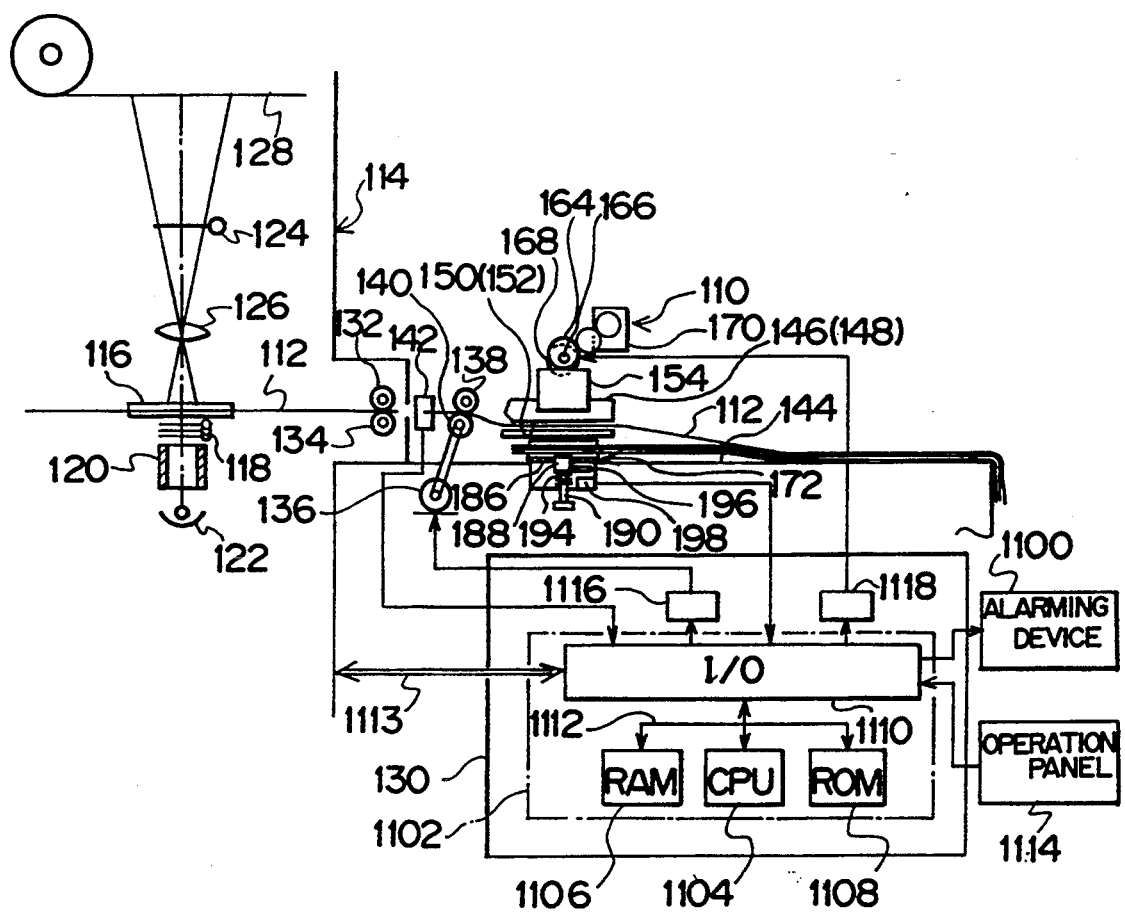
FIG. 11 is a schematic diagram of a printing section and a negative film accumulator in accordance with a fourth embodiment.
Figure 12:
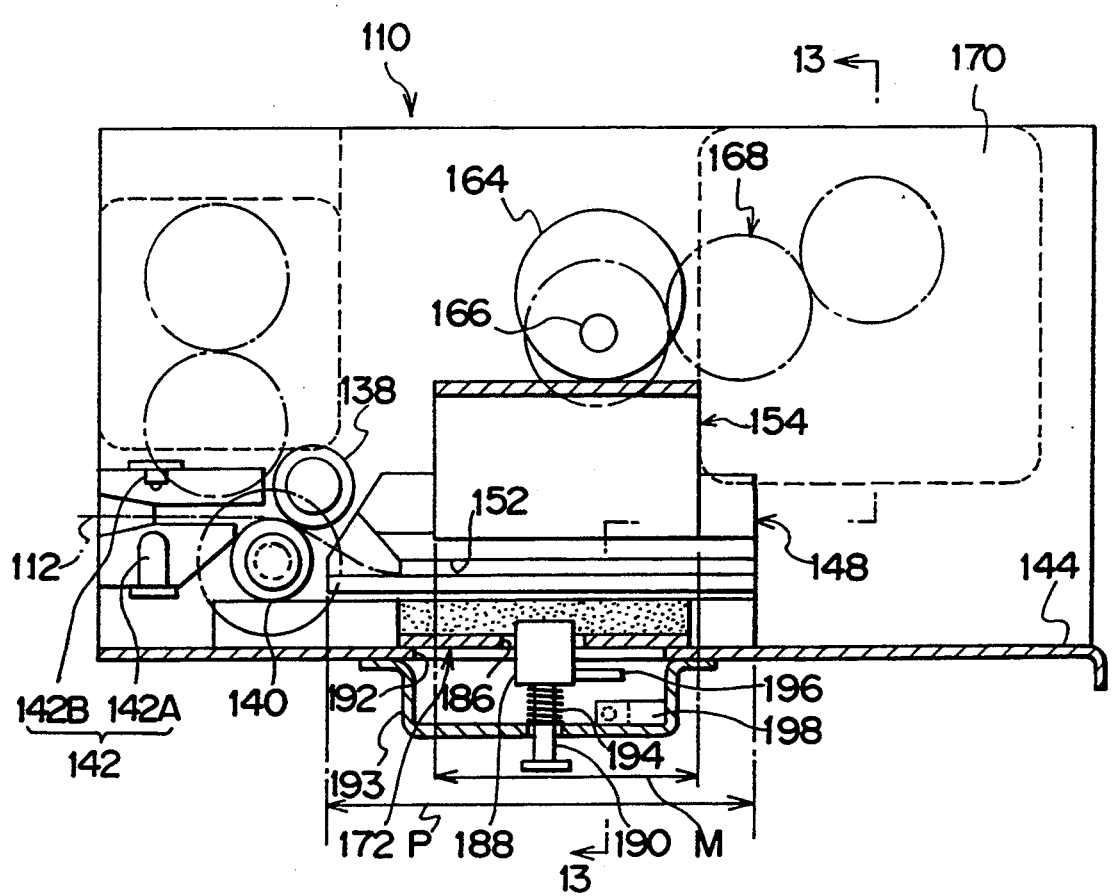
FIG. 12 is a vertical cross-sectional view of the negative film accumulator in accordance with the fourth embodiment.

FIGS. 11 and 12 show a fourth embodiment of a negative film accumulator 110 to which the present invention is applied. This negative film accumulator 110 is disposed adjacent to a printing section 114 for printing an image onto a printing paper by allowing light to be transmitted through a negative film 112 on which the image is recorded.

As shown in FIG. 11, a negative carrier 116 is disposed on a printing optical axis L of the printing section 114. Filters 118, a light diffusion tube 120, and a light source 122 are arranged below the negative carrier 116. In addition, a printing paper 128 is disposed above the negative carrier 116 via a shutter 124 and a lens 126.

Here, when a predetermined image frame reaches the printing optical axis L, the shutter 124 is opened, and the filters 118 are brought into and out of the optical axis in correspondence with the exposure conditions which have been set, thereby allowing an image transmitted through the negative to be exposed on the printing paper 128. This printing process is controlled by a controller 130. In addition, the controller 130 controls a transport system for consecutively positioning the negative film 112 at the printing position by feeding the negative film 112 by a required number of frames.

As shown in FIG. 12, the negative film 112 for which the printing operation has been completed at the printing section 114 is fed out by a pair of nip-transport rollers 132 and 134 located at a rear end of the printing section 114. The negative film 112 is then delivered to a pair of nip-transport rollers 138 and 140 which are rotated by a driving force of a motor 136 connected to the controller 130. A sensor 142 is interposed between the pair of nip-transport rollers 132 and 134 and the pair of nip-transport rollers 138 and 140, and is adapted to detect a trailing end of the negative film 112. The sensor 142 includes a light-projecting portion 142A and a light-receiving portion 142B which are disposed with the transport passage of the negative film 112 placed therebetween.

The nip-transport rollers 138 and 140 are disposed with a tangent thereto inclined, so that the negative film 112 which is fed out is oriented diagonally downward, and is guided into slits 150 and 152 formed in opposing surfaces of guide blocks 146 and 148 disposed above a support base 144. These slits 150 and 152 accommodate both sides of the negative film 112, and image portions located in a widthwise central portion of the negative film 112 is set in a state of noncontact.

These guide blocks 146 and 148 are fixedly disposed, and their longitudinal dimension P (along the longitudinal direction of the film 112) is set to be slightly longer than a longitudinal dimension M of a pressing block 154 disposed above the guide blocks 146 and 148.

Figure 13:
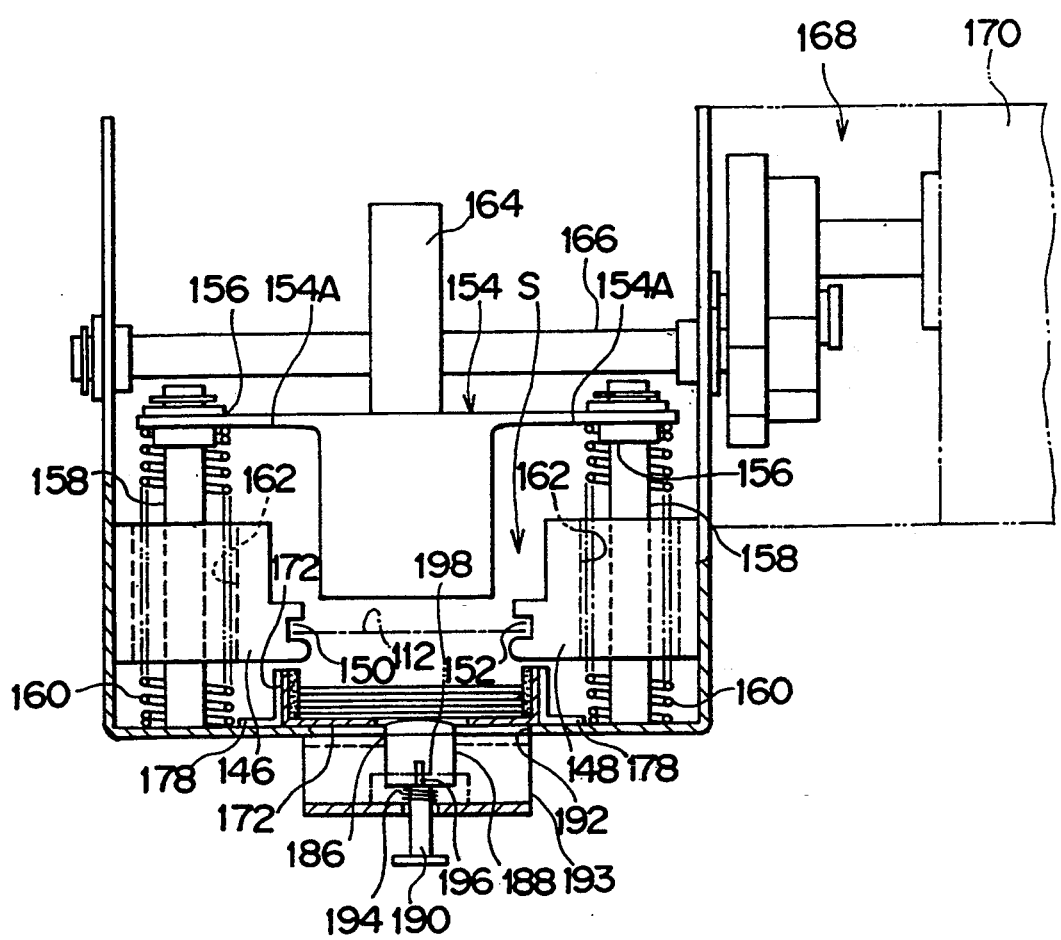
FIG. 13 is a cross-sectional view taken along line 13—13 in FIG. 12.

As shown in FIG. 13, a horizontal flange 154A is formed on an upper end portion of the pressing block 154, and a pair of sleeves 156 are secured thereto. These sleeves 156 are vertically movable along respective guide posts 158 disposed vertically, and are urged upwardly by compression coil springs 160.

It should be noted that intermediate portions of the guide posts 158 and the compression coil springs 160 are respectively passed through through holes 162 formed in the guide blocks 146 and 148. Hence, the guide blocks 146 and 148 do not interfere with the guide posts 158 and the compression coil springs 160.

The aforementioned pressing block 154 is adapted to be inserted into a space S between the guide blocks 146 and 148. That is, an eccentric cam 164 is disposed in face-to-face relation with an upper end surface of the pressing block 154, and a rotating shaft 166 of the eccentric cam 164 is coupled with a motor 170 via a reduction gear train 168. The motor 170 is controlled by the controller 130.

As the eccentric cam 164 is made to undergo one revolution by the driving force of the motor 170, the pressing block 154 enters the aforementioned space S between the guide blocks 146 and 148 and reciprocates along a path leading to a holder 172 disposed below the guide blocks 146 and 148.

For this reason, the negative film 112, which is located on the moving path of the pressing block 154 by being guided by the slits 150 and 152 in the guide blocks 146 and 148, is pressed toward the holder 172 by the approaching movement of the pressing block 154.

Figure 14A:
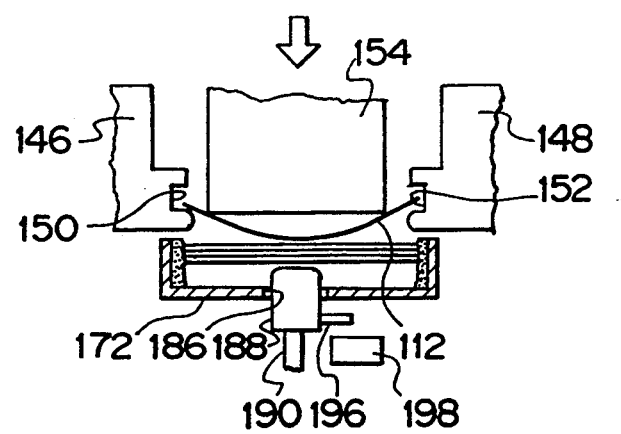
FIG. 14A is an operational diagram when the pressing block has started to move from the state shown in FIG. 13.

At this time, the negative film 112 is curved along the widthwise direction thereof and is deflected as seen in the longitudinal direction thereof (see FIG. 14A), allowing the film 112 to be released from the slits 150 and 152. The moment the film 112 is released, the deflection is canceled, and the film 112 is held in the holder 172 (see FIG. 10B).

Figure 15:
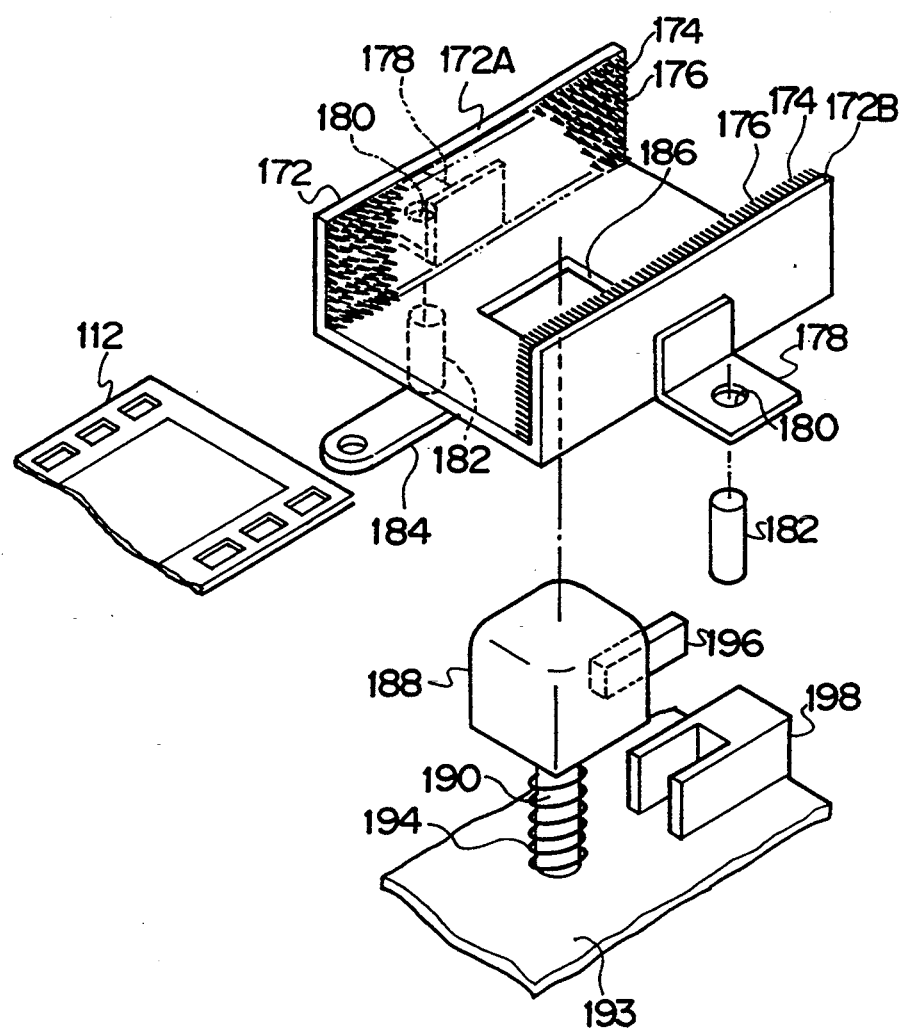
FIG. 15 is an exploded perspective view of a holder and its surrounding portions.

The holder 172 is disposed on the support base 144. As shown in FIG. 15, this holder 172 is formed of a plate material bent in a U-shape, and a cloth material 174 is attached to opposing surfaces of side plates 172A and 172B which are bent end portions. An interval between these pieces of cloth material 174 is set to be identical to or slightly wider than the widthwise dimension of the negative film 112. A multiplicity of engaging projections 176 project from the cloth material 174. As these engaging projections 176, it is possible to use synthetic resin filaments whose tips are bent, loop-like synthetic resin filaments whose opposite ends are secured to the cloth material 174, or other similar material. As both sides of the negative film 112 are engaged with these engaging projections 176, the negative film 112 can be held by the holder 172. The arrangement provided is such that, when the negative films 112 are held in a superimposed state between the two pieces of cloth material 174, the negative films 112 are capable of moving in the longitudinal direction thereof with a relatively light external force, but cannot move readily in the thicknesswise direction thereof.

An L-shaped projection 178 is secured to the outside of each of the side plates 172A and 172B, and a through hole 180 is formed in one of the L-shaped projections 178. This through hole 180 is used for insertion of a retaining pin 182 projecting from the support base 144, so that the holder 172 can be easily positioned and secured to the support base 144. Furthermore, a projection 184 having a through hole projects from a longitudinal end of the holder 172. When the holder 172 is removed together with the negative films 112, the holder 172 can be hung on an unillustrated hook by using this projection 184, so that the negative films 112 can be stored in the holder 172 with the longitudinal direction of the negative films 112 set in the vertical direction.

In addition, a rectangular hole 186, which is a through hole in accordance with the present invention, is provided in a bottom portion of the holder 172. A moving block 188 is accommodated in this rectangular hole 186. One end of a shaft 190 is secured to a lower end surface of the moving block 188. The other end of the shaft 190 is pivotally supported on a bracket 193 disposed in correspondence with a hole 192 formed in the support base 144. In addition, a compression coil spring 194 is attached to an intermediate portion of the shaft 190, so that an upper end surface of the moving block 188 projects above the floor surface by means of the urging force of the compression coil spring 194.

Here, when the number of the negative films 112 consecutively accumulated in the holder 172 is small, since the stroke of the pressing block 154 is short, the moving block 188 is in a state of noncontact with a lowermost one of the negative films 112. In addition, when the holder 172 is filled with the negative films 112, the lowermost one of the negative films 112 comes into contact with the moving block 188 and is subjected to a pressing force of the pressing block 154. The moving block 188 is then moved downward against the urging force of the compression coil spring 194.

A lever 196 is attached to a side portion of a lower end of the moving block 188. A sensor 198 for detecting the presence or absence of the lever 196 is disposed on a moving path of the lever 196.

The sensor 198 has bifurcated configuration in which a light-projecting portion and a light-receiving portion are disposed with a predetermined gap therebetween. The lever 196 is arranged to be brought into and away from this predetermined gap. For this reason, when the number of the negative films 112 accumulated in the holder 172 reaches a predetermined number, the pressing force of the pressing block 154 is imparted to the moving block 188 due to an increase in the thicknesswise dimension of the negative films 112. As a result, the lever 196 enters the gap in the sensor 198, thereby making it possible to detect an amount (the number) of the negative films 112 accumulated. It should be noted that, in this embodiment, a setting is provided such that when the number of the negative films 112 accumulation in the holder 172 reaches 30, the lever 196 enters the predetermined gap in the sensor 198 to change over a contact.

When the number of the negative films 112 accommodated in the holder 172 reaches the predetermined number (30), the controller 130 receives a signal from the sensor 198 and actuates an alarming device 200 for alarming the operator through an alarm and display. In addition, the controller 130 is adapted to stop subsequent print processing at the same time as the actuation of the alarming device 200 mentioned above.

As shown in FIG. 11, the controller 130 comprises a microcomputer 202 which includes a CPU 204, a RAM 206, a ROM 208, input/output ports 210, and buses 212 connecting them, such as data buses and control buses.

Signal lines 213 for a driving system for the above-described print processing and for a transport system for transporting the negative film 112 are connected to the input/output ports 210. In addition, an operation panel 214 is connected to the controller 130. Provided on the operation panel 214 are a start button for starting the print processing, a restart button for restarting from the state of a print processing stop upon actuation of the alarming device 200, and the like.

Furthermore, the motor 136 for rotating the nip-transport rollers 138 and 140 and the motor 170 for rotating the eccentric cam 164 are connected to the input/output ports 210 of the controller 130 via drivers 216 and 218, respectively. Also, the alarming device 200 is connected to the input/output ports 210.

In addition, connected to the input/output ports 210 are signal lines for the sensor 142 for detecting the trailing end of the negative film 112 fed out from the printing section 114 and for the sensor 198 for detecting that the number of the negative films 112 accumulated in the holder 172 has reached the predetermined number (30).

A description will now be given of the operation of this embodiment.

Figure 16:
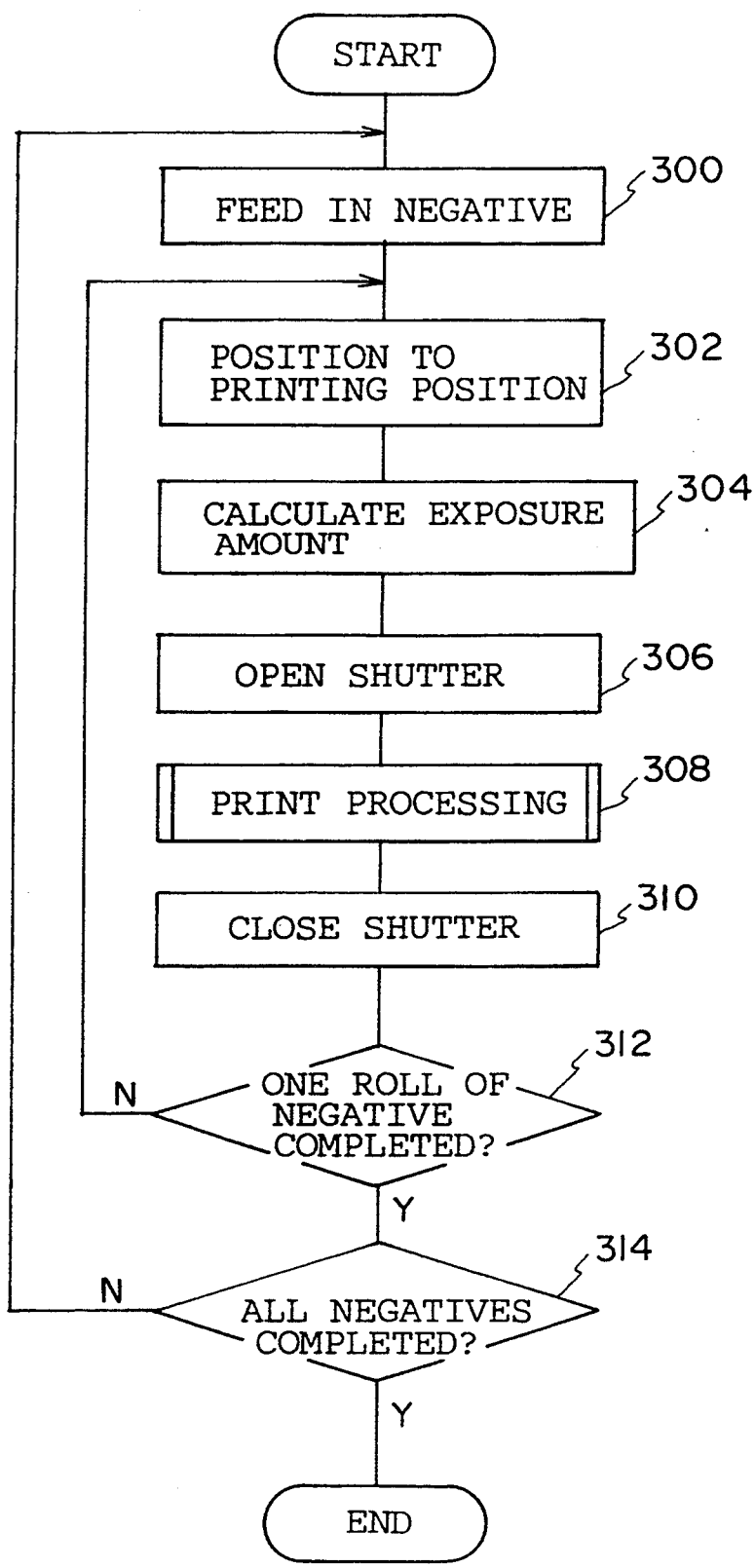
FIG. 16 is a flowchart showing the flow of a printing process in accordance with the fourth embodiment.

First, a description will be given of the print processing with reference to the flowchart shown in FIG. 16.

When the printing start button is operated, the negative film 112 is first fed in in Step 300, and the operation proceeds to Step 302 in which a predetermined image frame of the negative film 112 is positioned on the printing optical axis L by the negative carrier 116. In an ensuing Step 304, an exposure amount is calculated. Then, in Step 306, the shutter 124 is opened, and the operation proceeds to Step 308. In Step 308, the filters 118 are brought into and moved away from the optical path, and after the lapse of a predetermined time the operation proceeds to Step 310 to close the shutter 124. As a result, a transmitted image of the predetermined image frame is exposed on the printing paper 128.

In an ensuing Step 312, a determination is made as to whether or not the print processing of one roll of negative film 112 has been completed. If NO is the answer in the determination, the operation returns to Step 302 to effect print processing consecutively. Meanwhile, if YES is the answer in the determination in Step 312, a determination is made in Step 314 as to whether or not the processing of all the negative films 112 has been completed. If NO is the answer in the determination, the operation returns to Step 300 to instruct the feeding of an ensuing negative film 112.

After the negative film 112 for which the printing operation has been completed passes through the nip-transport rollers 138 and 140, the negative film 112 is pushed to the space between the guide blocks 146 and 148, and both sides of the negative film 112 is inserted into the slits 150 and 152.

Figure 17:
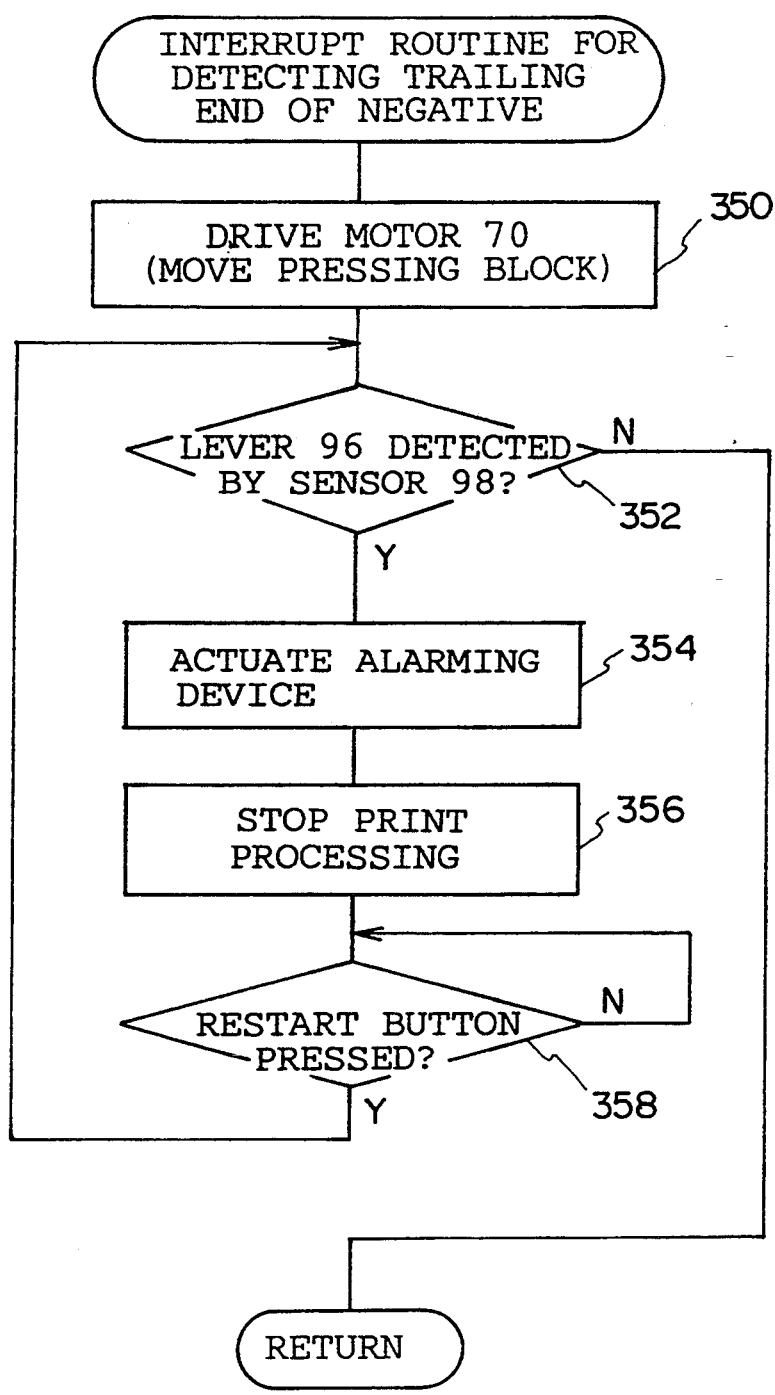
FIG. 17 is a flowchart showing the flow of a film accumulation process in accordance with the fourth embodiment.

When the transport is continued by the nip-transport rollers 138 and 140 in this state, the sensor 142 detects the trailing end of the negative film 112. Hereafter, referring to the flowchart shown in FIG. 17, a description will be given of a negative film accumulation control routine which interrupts the main routine when the trailing end of the negative film 112 is detected by the sensor 142.

Figure 14B:
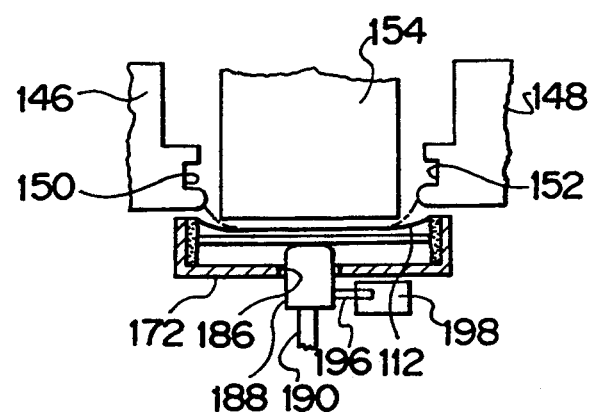
FIG. 14B is an operational diagram when the pressing block has reached the lowermost position.

When the passage of the printed trailing end of the negative film 112 is detected by the sensor 142, the motor 170 is driven in Step 350 to rotate the eccentric cam 164. For this reason, the pressing block 154 is lowered (approaching movement) from the state shown in FIG. 13, and enters the space S between the guide blocks 146 and 148 (see FIG. 14A). Since the negative film 112 is pressed by the pressing block 154, the negative film 112 is curved along the widthwise direction thereof and is deflected as seen in the longitudinal direction thereof. Due to this deflection, the sides of the negative film 112 are released from the slits 150 and 152 (see FIG. 14B).

The moment the film 112 is released, the aforementioned deflection is canceled, and the sides of the negative film 112 are held in the holder 172. That is, the arrangement provided is such that the negative film 112 is curved along the widthwise direction thereof so as to be released from the slits 150 and 152. For this reason, the negative film 112 is held either in the slits 150 and 152 formed in the guide blocks 146 and 148 or in the holder 172, and is not set temporarily free. Hence, even if the negative film 112 has undergone twisting at a leading end or intermediate portion thereof, each negative film 112 can be held reliably in the holder 172 in proper form.

Next, the pressing block 154 is raised again (returning movement) and is retracted from the space S between the guide blocks 146 and 148, so that the insertion of an ensuing negative film 112 becomes possible. In this manner, the multiplicity of negative films 112 are consecutively superposed one on top of another in the holder 172.

In an ensuing Step 352, a determination is made as to whether or not the number of the negative films 112 in the holder 172 has reached the predetermined number (30). That is, when the number of the negative films 112 accumulated is small, the lowermost negative film 112 and the moving block 188 do not contact each other, but when the number of the films 112 accumulated reaches the predetermined number, the lowermost negative film 112 and the moving block 188 come into contact with each other, so that the moving block 188 is subjected to the pressing force of the pressing block 154. Hence, the moving block 188 is lowered against the urging force of the compression coil spring 194. Detection can be effected as the lever 196 enters the gap between the light-projecting portion and the light-receiving portion of the sensor 198 in conjunction with the lowering of the moving block 188.

If NO is the answer in the determination in Step 352, a determination is made that the accumulation of more negative films 112 is possible, so that the operation returns to the main routine. Meanwhile, if YES is the answer in the determination in Step 352, a determination is made that no more negative films 112 can be stored in the holder 172, and the operation proceeds to Step 354 to actuate the alarming device 200. As a result, an alarm and a display are given, so that the operator can be notified. In an ensuing Step 356, print processing in the printing section 114 is stopped, and the operation proceeds to Step 358. It should be noted that when print processing is being performed, the stopping of print processing is preferably effected after the shutter 124 is closed.

Here, the holder 172 is removed by pulling out the L-shaped projection 178 from the engaging pin 182, and after the holder 172 is suspended from a hook or the like by making use of the projection 184 and is thus stored, an operation of loading a new holder 172 is carried out.

In Step 358, a determination is made as to whether or not the restart button has been pressed, and if YES is the answer in the determination, the operation returns to the main routine on condition that the lever 196 has not been detected by the sensor 188 in Step 352, i.e., on condition that the holder 172 is not full.

In accordance with this embodiment, the negative film 112 for which print processing has been completed does not slide over the negative film 112 which is already accommodated in the holder 172, so that no damage is caused to the image plane.

In addition, when the amount of the negative films 112 accumulated in the holder 172 is small, the moving block 188 does not contact the negative film 112, so that no damage is caused to the image plane and the like of the negative film 112.

Furthermore, even if the operator does not constantly monitor the number of the films accumulated, when the number of the films accumulated reaches the predetermined number, an alarm is automatically issued, and the subsequent print processing is stopped. Hence, the jamming of the negative film 112 being fed out with the negative film 112 accumulated does not occur.

The film accumulator and the film accumulator/holder in accordance with this embodiment offers an outstanding advantage in that the films being fed out from the printer or the processor can be automatically accumulated consecutively without causing damage to the image plane, and that the state of accumulation can be monitored.

[Fifth Embodiment]

Figure 18:
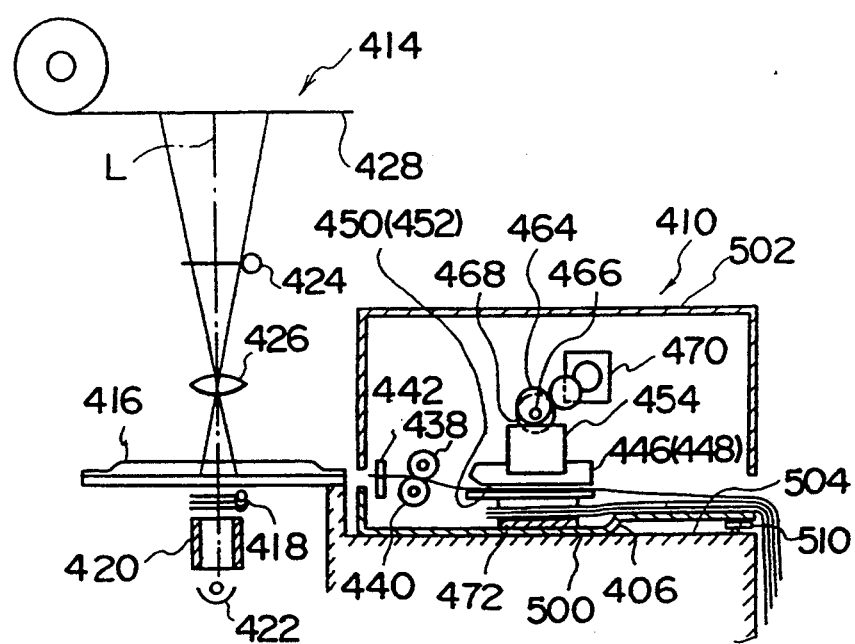
FIG. 18 is a schematic diagram of a printing section and a negative film accumulator in accordance with a fifth embodiment.
Figure 19:
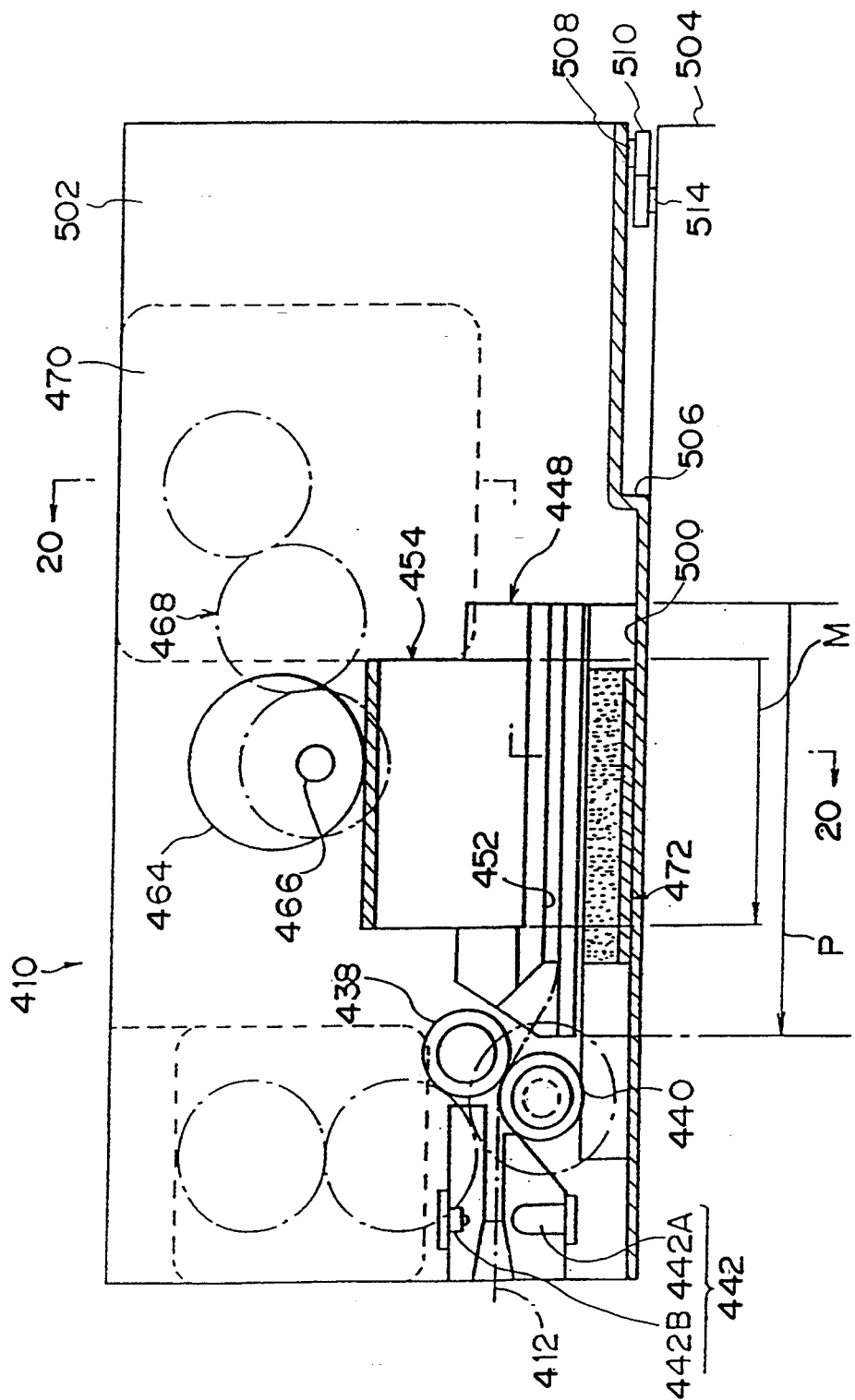
FIG. 19 is a vertical cross-sectional view of the negative film accumulator in accordance with the fifth embodiment.

FIGS. 18 and 19 show a fifth embodiment of a negative film accumulator 410 to which the present invention is applied. This negative film accumulator 410 is disposed adjacent to a printing section 414 for printing an image onto a printing paper by allowing light to be transmitted through a negative film 412 on which the image is recorded.

As shown in FIG. 18, a negative carrier 416 is disposed on a printing optical axis L of the printing section 414. Filters 418, a light diffusion tube 420, and a light source 422 are arranged below the negative carrier 416. In addition, a printing paper 428 is disposed above the negative carrier 416 via a shutter 424 and a lens 426.

Here, when a predetermined image frame reaches the printing optical axis L, the shutter 424 is opened, and the filters 418 are brought into and out of the optical axis in correspondence with the exposure conditions which have been set, thereby allowing an image transmitted through the negative to be exposed on the printing paper 428.

As shown in FIG. 19, the negative film 412 for which the printing operation has been completed at the printing section 414 is delivered to a pair of nip-transport rollers 438 and 440 which are rotated by a driving force of an unillustrated motor. These nip-transport rollers 438 and 440 constitute parts of the negative film accumulator 410. The component parts of the negative film accumulator 410, including these nip-transport rollers 438 and 440, are assembled on a unit base 500, and are covered with a casing 502.

A sensor 442 is disposed upstream of the nip-transport rollers 438 and 440, and is adapted to detect the trailing end of the negative film 412. The sensor 442 includes a light-projecting portion 442A and a light-receiving portion 442B which are disposed with the transport passage of the negative film 412 placed therebetween.

The nip-transport rollers 438 and 440 are disposed with a tangent thereto inclined, so that the negative film 412 which is fed out is oriented diagonally downward, and is guided into slits 450 and 452 formed in opposing surfaces of guide blocks 446 and 448 disposed above the unit base 500. These slits 450 and 452 accommodate both sides of the negative film 412, and image portions located in a widthwise central portion of the negative film 412 is set in a state of noncontact.

These guide blocks 446 and 448 are fixedly disposed, and their longitudinal dimension P (along the longitudinal direction of the film 412) is set to be slightly longer than a longitudinal dimension M of a pressing block 454 disposed above the guide blocks 446 and 448.

Figure 20:
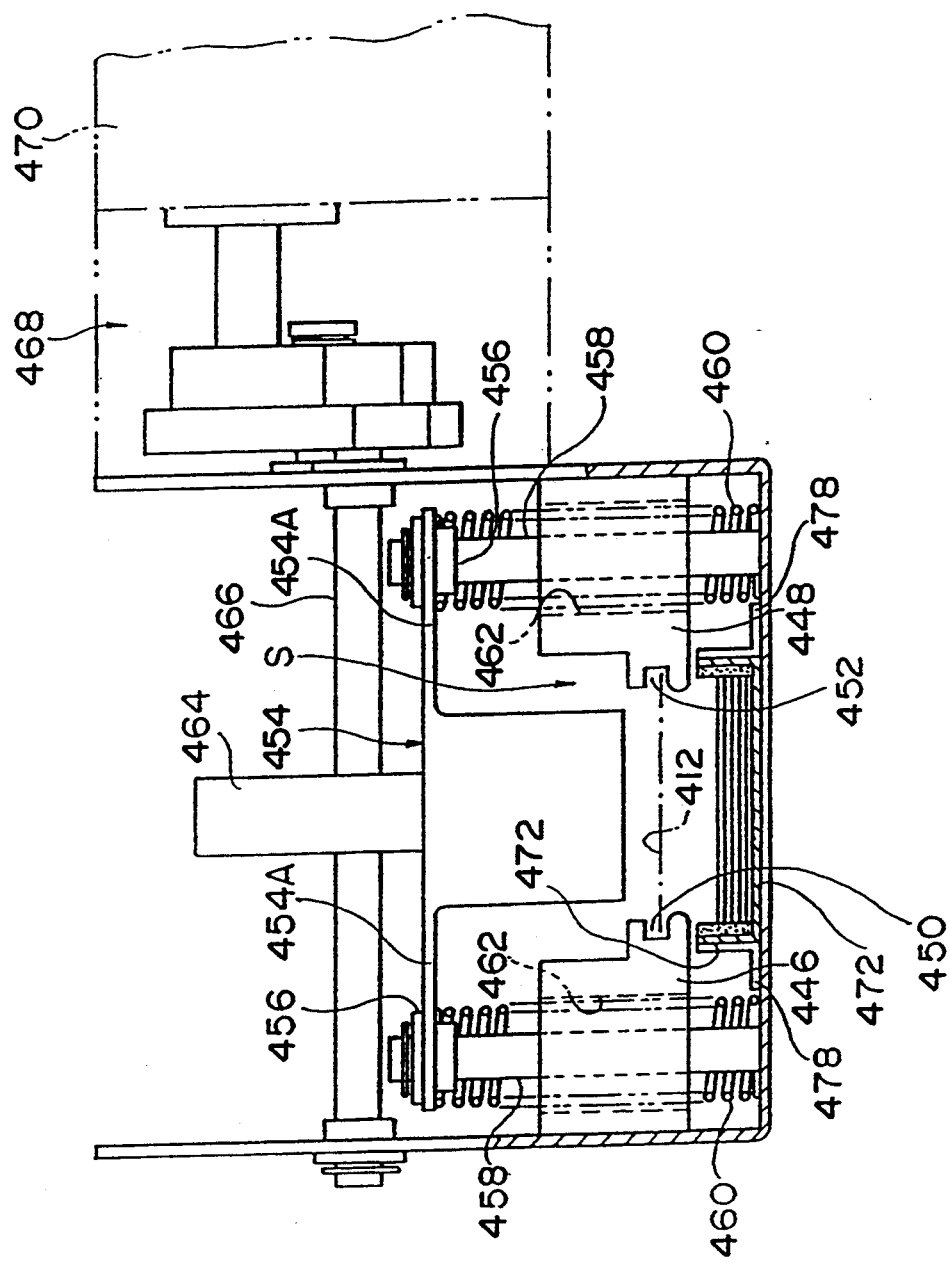
FIG. 20 is a cross.-sectional view taken along line 20—20 in FIG. 19.

As shown in FIG. 20, a horizontal flange 454A is formed on an upper end portion of the pressing block 454, and a pair of sleeves 456 are secured thereto. These sleeves 456 are vertically movable along respective guide posts 458 disposed vertically, and are urged upwardly by compression coil springs 460.

It should be noted that intermediate portions of the guide posts 458 and the compression coil springs 460 are respectively passed through through holes 462 formed in the guide blocks 446 and 448. Hence, the guide blocks 446 and 448 do not interfere with the guide posts 458 and the compression coil springs 460.

The aforementioned pressing block 454 is adapted to be inserted into a space S between the guide blocks 446 and 448. That is, an eccentric cam 464 is disposed in face-to-face relation with an upper end surface of the pressing block 454, and a rotating shaft 466 of the eccentric cam 464 is coupled with a motor 470 via a reduction gear train 468.

As the eccentric cam 464 is made to undergo one revolution by the driving force of the motor 470, the pressing block 454 enters the aforementioned space S between the guide blocks 446 and 448 and reciprocates along a path leading to a holder 472 disposed below the guide blocks 446 and 448.

For this reason, the negative film 412, which is located on the moving path of the pressing block 454 by being guided by the slits 450 and 452 in the guide blocks 446 and 448, is pressed toward the holder 472 by the approaching movement of the pressing block 454.

Figure 21A:
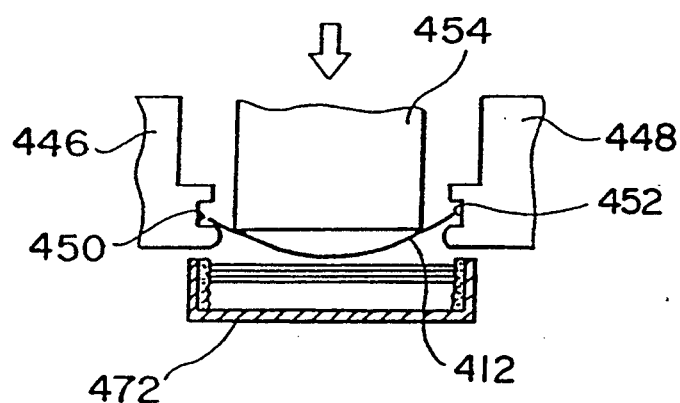
FIG. 21A is an operational diagram when the pressing block has started to move from the state shown in FIG. 20.
Figure 21B:
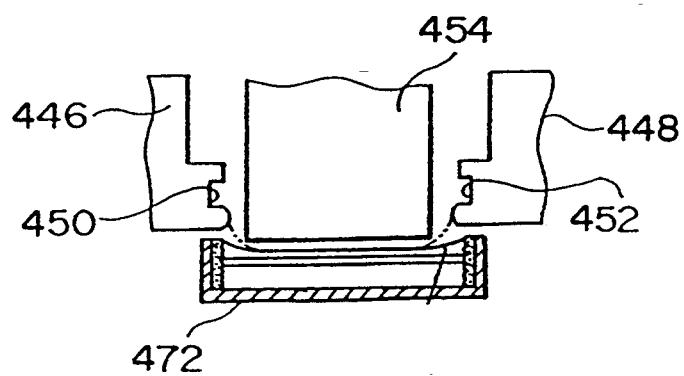
FIG. 21B is an operational diagram when the pressing block has reached the lowermost position.

At this time, the negative film 412 is curved along the widthwise direction thereof and is deflected as seen in the longitudinal direction thereof (see FIG. 21A), allowing the film 412 to be released from the slits 450 and 452. The moment the film 412 is released, the deflection is canceled, and the film 412 is held in the holder 472 (see FIG. 21B).

Since the holder 472 is arranged in the same way as the holder 24 in accordance with the first embodiment, a detailed description thereof will be omitted here.

Here, the unit base 500, to which the negative film accumulator 410 is assembled, and the casing 502 covering the same are supported on a support base 504 located downstream of the printing section 414. The unit base 500 is formed of a substantially rectangular plate material in a plan view.

Figure 22:
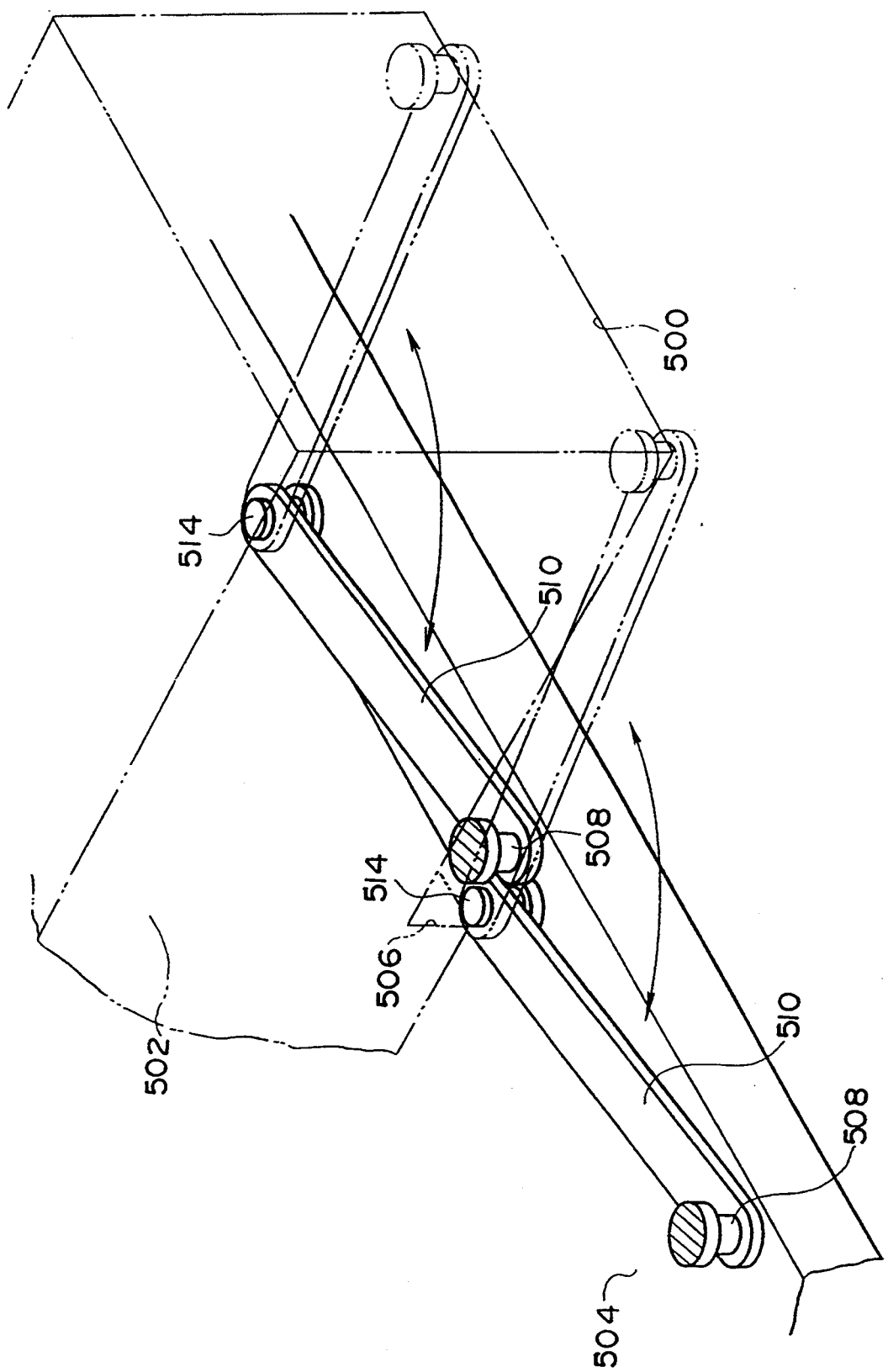
FIG. 22 is a perspective view illustrating a moving mechanism of the negative film accumulator in accordance with the fifth embodiment.
Figure 23:
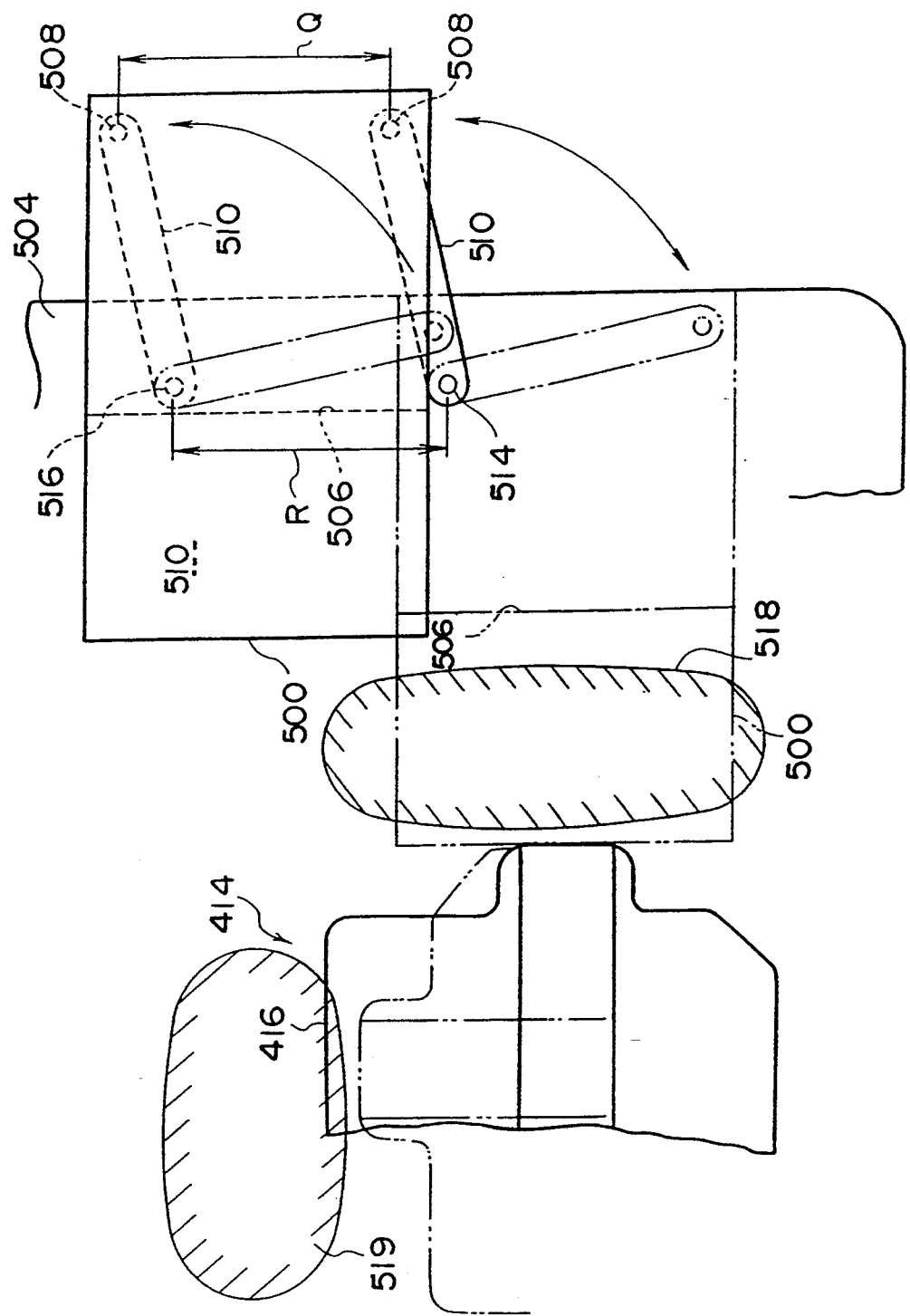
FIG. 23 is a plan view illustrating the moving mechanism of the negative film accumulator in accordance with the fifth embodiment.

As shown in FIGS. 22 and 23, a stepped portion 506 is formed in the unit base 500 downstream of the position where the holder 472 is located. A space is formed between the unit base 500 and the support base 504 on the downstream side of the stepped portion 506. A pair of shafts 508 are provided at two downstream corners, as viewed in the traveling direction of the film 412, of the portion of the unit base 500 corresponding to the space in such a manner as to project downward into the space. One ends of arms 510 constituting parts of a parallel link mechanism are rotatably supported on the shafts 508, respectively.

Meanwhile, a pair of shafts 514 are disposed on the support base 504 at a downstream end thereof in an upwardly projecting manner. A pitch R (see FIG. 23) between these shafts 514 agrees with a pitch Q (see FIG. 23) between the shafts 508 projecting from the lower surface of the unit base 500.

The other ends of the arms 510 are rotatably supported on the shafts 514, respectively.

Here, when the unit base 500 is located adjacent to the downstream side of the negative carrier 416 (see phantom lines in FIG. 23), the unit base 500 is located above the support base 504 (see solid lines in FIG. 22).

The negative film accumulator 410 assembled to the unit base 500 is normally located on the transport path of one roll of negative film 412, but in the case of negative films cut into a plurality of frames (usually six frames) and half-size negative films (hereafter simply referred to as half-size negatives), the negative carrier 416 is rotated 90°, and the half-size negatives are fed from this side (the lower side as viewed in FIG. 23) of the printing section 414 to the farther side thereof so as to effect print processing. For this reason, the half-size negatives for which print processing has been completed are discharged to the farther side of the printing section.

For this reason, a space 518 (a portion surrounded by slanting lines in FIG. 23) for collecting the half-size negatives thus discharged is secured by retracting the negative film accumulator 410. As the negative film accumulator 410 is retracted, it is possible to secure a working space which allows the operator to extend his or her arms to a space 519 (a portion surrounded by slanting lines in FIG. 23) into which the half-size negatives are discharged.

That is, if the arms 510 are rotated about the shafts 514, the shafts 508 on the unit base 500 side and the arms 510 rotate relative to each other, so that the unit base 500 is moved in parallel downstream of the usual transport path of the negative film toward the farther side thereof (see solid lines in FIG. 23). As the unit base 500 retracts through parallel movement, the working space 518 for collecting the half-size negatives is secured without causing a twisting of the negative film 412 accommodated and held in the holder 472.

The operation of this embodiment will be described hereafter.

When print processing of one usual roll of negative film 412 is performed, the unit base 500 is located adjacent to the downstream side of the negative carrier 416. For this reason, the negative film accumulator 410 can be located on the transport path. At that time, the arms 510 are set in a state in which they are folded on the support base 504.

When the print start button is operated, the negative film 412 is fed in, and a predetermined image frame of the negative film 412 is positioned on the printing optical axis L by the negative carrier 416. In this state, the shutter 424 is opened for a predetermined time on the basis of exposure conditions, the filters 418 are brought into and out of the optical axis, and a transmitted image of the predetermined image frame is exposed on the printing paper 428.

When the transport is continued by the nip-transport rollers 438 and 440 in this state, the sensor 442 detects the trailing end of the negative film 412. When the passage of the printed trailing end of the negative film 412 is detected by the sensor 442, the motor 470 is driven to rotate the eccentric cam 464. For this reason, the pressing block 454 is lowered (approaching movement) from the state shown in FIG. 20, and enters the space S between the guide blocks 446 and 448 (see FIG. 21A). Since the negative film 412 is pressed by the pressing block 454, the negative film 412 is curved along the widthwise direction thereof and is deflected as seen in the longitudinal direction thereof. Due to this deflection, the sides of the negative film 412 are released from the slits 450 and 452 (see FIG. 21B).

The moment the film 412 is released, the aforementioned deflection is canceled, and the sides of the negative film 412 are held in the holder 472. That is, the arrangement provided is such that the negative film 412 is curved along the widthwise direction thereof so as to be released from the slits 450 and 452. For this reason, the negative film 412 is held either in the slits 450 and 452 formed in the guide blocks 446 and 448 or in the holder 472, and is not set temporarily free. Hence, even if the negative film 412 has undergone twisting at a leading end or intermediate portion thereof, each negative film 412 can be held reliably in the holder 472 in proper form.

Next, the pressing block 454 is raised again (returning movement) and is retracted from the space S between the guide blocks 446 and 448, so that the insertion of an ensuing negative film 412 becomes possible. In this manner, the multiplicity of negative films 412 are consecutively superposed one on top of another in the holder 472.

Here, when the holder 472 has become full, the holder 472 is removed by pulling out the L-shaped projection 478 from the engaging pin 482, and after the holder 472 is suspended from a hook or the like by making use of the projection 484 and is thus stored, an operation of loading a new holder 472 is carried out.

The foregoing is the print processing and accumulation procedure for one roll of negative film 412. However, in cases where print processing is performed in this printing section 414 by using half-size negatives, the negative carrier 416 is rotated 90°. For this reason, the half-size negatives are fed from this side (the lower side as viewed in FIG. 23) of the printing section 414, and when print processing is completed, they are discharged to the farther side of the printing section.

At that time, when the half-size negatives for which print processing has been completed are collected, the negative film accumulator 410 has been in the way, thereby making it impossible to secure the working space 518 for collection. In this embodiment, however, the unit base 500 to which the negative film accumulator 410 is assembled is retracted by the rotation of the arms 510.

That is, if the arms 510 are rotated about the shafts 514, the unit base 500 connected to the arms 510 is moved. At that time, since the arms 510 and the shafts 508 which link the arms 510 and the unit base 500 rotate relative to each other, the unit base 500 moves in parallel downstream of the usual transport path of the negative film 412 toward the farther side thereof.

If the arms 510 rotate substantially 90°, the working space 518 for recovering the half-size negatives can be secured between the negative carrier 416 and the negative film accumulator 410. Accordingly, the operator can readily extend his or her arms to the space 519 to which the half-size negatives are discharged, thereby improving the efficiency in the collection work.

When the negative film accumulator 410 is retracted, there are cases where the movement for retraction is performed with the plurality of negative films 412 held in the holder 472. In this embodiment, however, since the unit base 500 is made to undergo parallel movement, the negative films 412 which have been accumulated are prevented from being twisted. Hence, the retracting movement can be performed stably with the negative films 412 held in the holder 472.

In this embodiment, the negative film accumulator 410 is retracted to secure a working space for collecting piece negatives of a half size. However, by virtue of the retraction of the negative film accumulator, it is also possible to secure a working space for a reprinting operation or a make-over operation by using piece negatives of a full size. In other words, in the case of the piece negatives, there are cases where the operator extends his or her arms to the upstream and downstream sides of the negative carrier 416 to perform a positioning or other similar operation, so that a working space for this operation can be secured.

As described above, the moving mechanism for the film accumulator in accordance with this embodiment offers an outstanding advantage in that in cases where the operator performs an operation in the vicinity of the printer, a working space in the vicinity of the printer can be secured by retracting the film accumulator while the state of accumulation of the films accumulated in the film accumulator is being maintained.

What is claimed is:

1. A film accumulator for accumulating a plurality of elongated, strip-like photographic films which are consecutively fed out, comprising:
   a support portion on which the plurality of films which are consecutively fed out are placed one on top of the other in an accumulated state; and
   holding means for holding portions of the plurality of films placed on said support portion, wherein said holding means has a multiplicity of projections for holding the plurality of films by engaging the widthwise sides of the plurality of films.

2. A film accumulator according to claim 1, further comprising pressing means for consecutively pressing toward said holding means the plurality of films which are consecutively fed out, so as to allow said holding means to hold the plurality of films.

3. A film accumulator according to claim 2, wherein said pressing means is arranged to press each of the plurality of films in a thicknesswise direction thereof.

4. A film accumulator according to claim 1, wherein said holding means holds respective trailing ends of the plurality of films.

5. A film accumulator according to claim 5, further comprising detecting means for detecting that said holding means has held a predetermined number of the films.

6. A film accumulator according to claim 5, further comprising alarming means for issuing an alarm when said detecting means has detected a holding of the predetermined number of the films.

7. A film accumulator according to claim 5, wherein said detecting means effects the detection by being pressed by a lowermost one of the films when the predetermined number of the films has been held.

8. A film accumulator for accumulating a plurality of films which are consecutively fed out, comprising:
movement allowing means for supporting widthwise sides of a longitudinal partial portion of each of the films which are consecutively fed out and for allowing the movement of the films in a longitudinal direction thereof, wherein said movement allowing means has a pair of movable members which are disposed in correspondence with the widthwise sides of the film and are capable of moving toward or away from each other, and urging means for urging said pair of movable members in a direction in which said pair of movable members are urged in a mutually approaching direction;
pressing means for pressing, in a thicknesswise direction of the film, each of the films supported by said movement allowing means so as to release said each of the films from said movement allowing means; and
holding means for holding longitudinal partial portions of the plurality of the films which have been released from said movement allowing means by said pressing means.

9. A film accumulator according to claim 8, wherein said movement allowing means releases the widthwise sides of the longitudinal partial portion of each of the films when pressed by said pressing means.

10. A film accumulator according to claim 8, wherein said pair of movable members are each provided with a groove for accommodating a corresponding widthwise side of each of the films.

11. A film accumulator according to claim 10, further comprising changing means for changing a traveling direction of the film so that the widthwise sides of the film are accommodated in the corresponding grooves.

12. A film accumulator according to claim 10, wherein said pair of movable members are arranged to be spaced apart from each other in interlocking relation with the pressing by the pressing means.

13. A film accumulator for accumulating a plurality of films which are consecutively fed out, comprising:
movement allowing means for supporting widthwise sides of a longitudinal partial portion of each of the films which are consecutively fed out and for allowing the movement of the films in a longitudinal direction thereof;
pressing means for pressing, in a thicknesswise direction of the film, each of the films supported by said movement allowing means so as to release said each of the films from said movement allowing means; and
holding means for holding longitudinal partial portions of the plurality of the films which have been released from said movement allowing means by said pressing means, wherein said movement allowing means has a pair of mutually opposing grooves each adapted to accommodate a corresponding one of the widthwise sides of each of the films, and wherein said pressing means causes each of the films to be deflected in a convex shape as viewed in a pressing direction by pressing the film, thereby to release the film from said movement allowing means.

14. A film accumulator according to claim 8, wherein said holding means has a multiplicity of engaging projections for engaging the widthwise sides of each of the films to hold the films.

15. A film accumulator according to claim 8, further comprising detecting means for detecting that said holding means has held a predetermined number of the films.

16. A film accumulator according to claim 15, further comprising alarming means for issuing an alarm when said detecting means has detected a holding of the predetermined number of the films.

17. A film accumulator for accumulating a plurality of films which are consecutively fed out, comprising:
pressing means for consecutively pressing in a thicknesswise direction of the film the plurality of films which are consecutively fed out;
holding means for holding widthwise sides of the plurality of films pressed by said pressing means in an accumulated state; and
detecting means for detecting an accumulation of a predetermined number of the films by being pressed by a lowermost one of the films when the number of the films accumulated in said holding means has reached the predetermined number.

18. A film accumulator according to claim 17, further comprising alarming means for issuing an alarm when said detecting means has detected the accumulation of the predetermined number of the films.

19. A film accumulator according to claim 17, wherein said holding means has a multiplicity of engaging projections for engaging the widthwise sides of each of the films to hold the films.

20. A film accumulator/holder for holding a plurality of films in a state in which the plurality of films are accumulated in a widthwise direction of the film, comprising:
an accumulating portion formed with a substantially U-shaped cross section by a bottom wall opposing one surface of each of the films which are accumulated and a pair of side walls opposing widthwise sides of said each of the films accumulated,
wherein a through hole is formed in said bottom wall, and further comprising detecting means disposed for insertion in said through hole and for detecting that the number of the films accumulated has reached a predetermined number.

21. A film accumulator/holder according to claim 20, wherein said detecting means detects a pressing toward said bottom wall by an uppermost one of the predetermined number of said films accumulated.

22. A film accumulator/holder according to claim 21, wherein each of said side walls has a multiplicity of engaging projections for engaging a corresponding widthwise side of each of the films to hold the films.

* * * * *